US008960712B2

(12) United States Patent
Kanno et al.

(10) Patent No.: US 8,960,712 B2
(45) Date of Patent: Feb. 24, 2015

(54) WHEEL FOR WHEELCHAIR AND WHEELCHAIR

(71) Applicant: Yamaha Hatsudoki Kabushiki Kaisha, Shizuoka-ken (JP)

(72) Inventors: Nobuyuki Kanno, Shizuoka (JP); Hiroyuki Mizutani, Shizuoka (JP); Haruyoshi Hino, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 14/023,356

(22) Filed: Sep. 10, 2013

(65) Prior Publication Data

US 2014/0077581 A1     Mar. 20, 2014

(30) Foreign Application Priority Data

Sep. 14, 2012 (JP) ................................. 2012-203566
Jul. 9, 2013 (JP) ................................. 2013-143468

(51) Int. Cl.
*B60K 1/00* (2006.01)
*B60K 7/00* (2006.01)
*A61G 5/04* (2013.01)
*A61G 5/02* (2006.01)
*B60K 17/04* (2006.01)
*H02K 11/00* (2006.01)

(52) U.S. Cl.
CPC .............. *B60K 7/0007* (2013.01); *A61G 5/045* (2013.01); *A61G 5/02* (2013.01); *B60K 17/043* (2013.01); *H02K 11/0021* (2013.01); *A61G 2005/048* (2013.01); *B60K 2007/0038* (2013.01); *B60K 2007/0092* (2013.01); *B60Y 2200/84* (2013.01)
USPC ........................................ 280/647; 180/65.6

(58) Field of Classification Search
USPC ........ 180/907, 250.1, 304.1, 65.5, 65.8, 19.1; 297/DIG. 4
See application file for complete search history.

(56) References Cited

U.S. PATENT DOCUMENTS

| 4,978,899 A | * | 12/1990 | Lautzenhiser et al. ........ 318/269 |
| 5,427,193 A | * | 6/1995 | Avakian ..................... 180/65.51 |
| 5,651,422 A | * | 7/1997 | Casali ............................. 180/13 |
| 5,732,786 A | | 3/1998 | Fujigaki |

(Continued)

FOREIGN PATENT DOCUMENTS

| EP | 0691232 A2 | 1/1996 |
| EP | 1342994 A1 | 9/2003 |
| JP | 08-117291 A | 5/1996 |
| JP | 09-000575 A | 1/1997 |
| JP | 09-117476 A | 5/1997 |
| JP | 09-154894 A | 6/1997 |

OTHER PUBLICATIONS

The extended European search report issued on Dec. 13, 2013, which corresponds to EP13004308.6-1651 and is related to U.S. Appl. No. 14/023,356.

*Primary Examiner* — John Walters
*Assistant Examiner* — James Triggs
(74) *Attorney, Agent, or Firm* — Studebaker & Brackett PC

(57) ABSTRACT

A wheel includes an axle, a motor, a hub and a rotational displacement detection mechanism. The axle is supported on a body frame of a wheelchair. The motor is mounted on the axle. The hub includes a wheel hub mounted on the axle and handrim base section relatively rotatably supported on the axle and rotatable relative to the wheel hub. The rotational displacement detection mechanism detects rotational displacements of the handrim base section relative to the wheel hub and has a center of rotation coinciding with an axle center of the motor.

15 Claims, 31 Drawing Sheets

(56) References Cited

U.S. PATENT DOCUMENTS

| | | | |
|---|---|---|---|
| 6,155,367 A * | 12/2000 | Alber | 180/65.51 |
| 6,840,340 B2 * | 1/2005 | Inoue et al. | 180/19.3 |
| 7,144,025 B2 * | 12/2006 | Wakita et al. | 280/250.1 |
| 7,311,160 B2 * | 12/2007 | Lim | 180/9.26 |
| 2004/0016875 A1 | 1/2004 | Yoerger et al. | |
| 2005/0087954 A1 * | 4/2005 | Wakita et al. | 280/304.1 |
| 2007/0056785 A1 | 3/2007 | Wu | |
| 2008/0073869 A1 * | 3/2008 | Patterson | 280/244 |

\* cited by examiner

F I G. 7
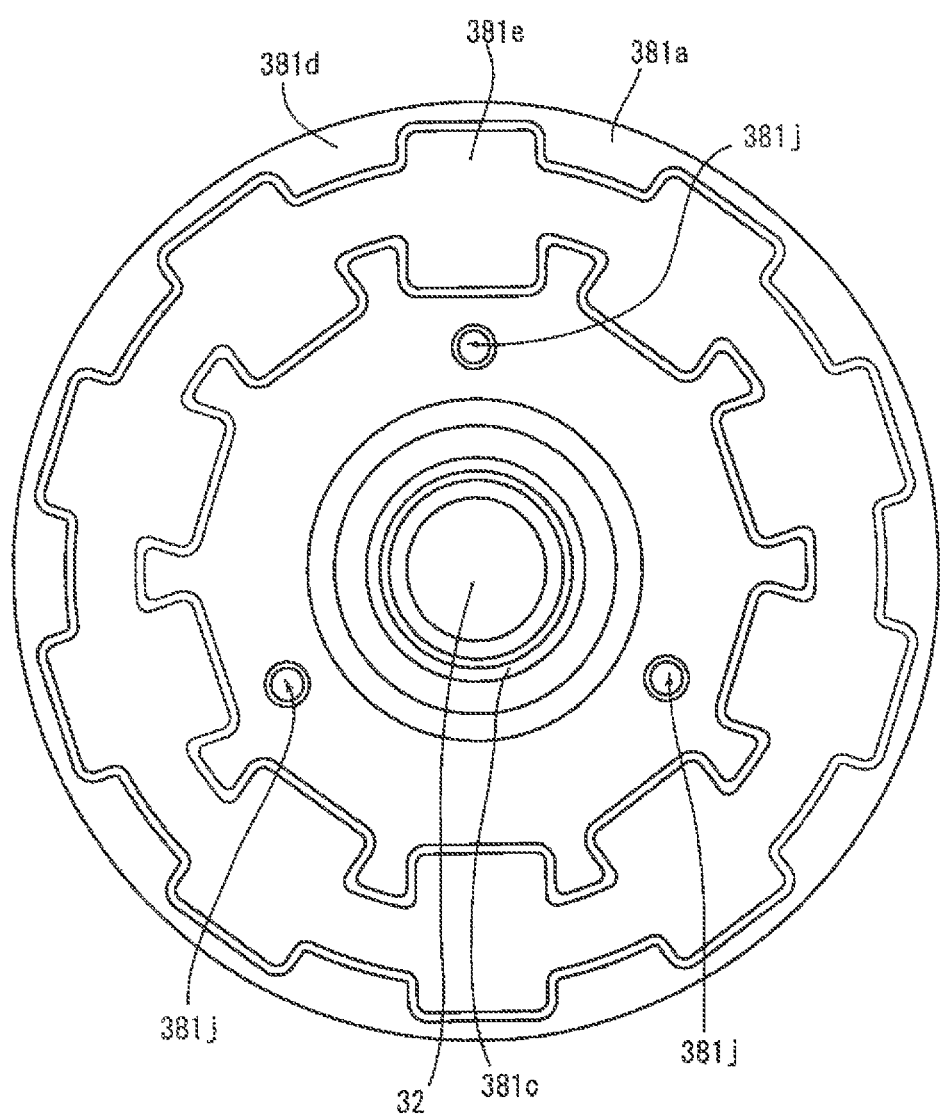

FIG. 11
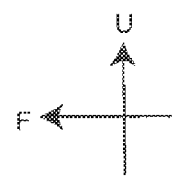
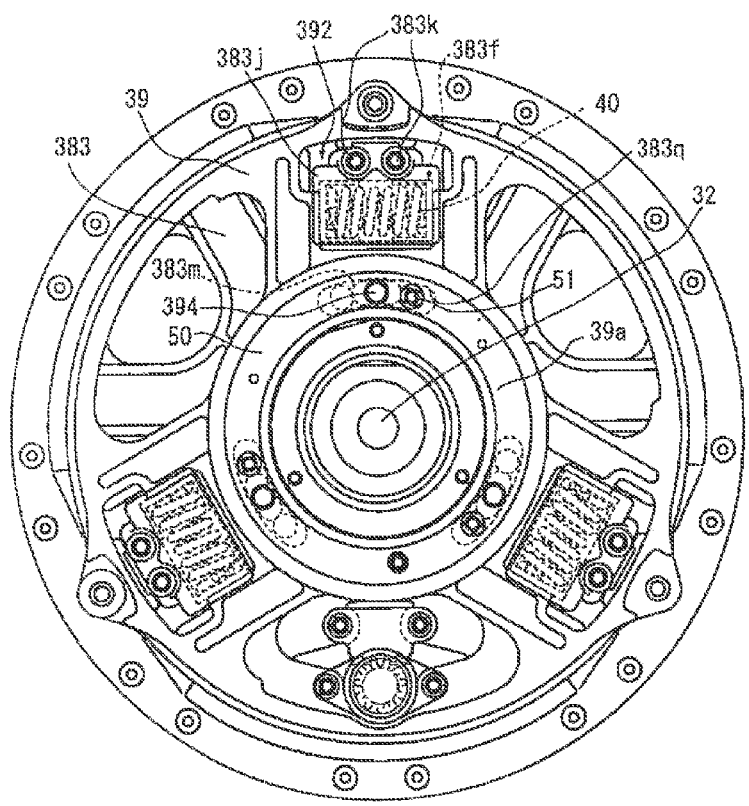

WHEEL FOR WHEELCHAIR AND WHEELCHAIR

CROSS REFERENCE TO RELATED APPLICATION

The disclosure of Japanese Patent Applications enumerated below including their specifications, drawings and claims are incorporated herein by reference in their entirety:
No. 2012-203566 filed Sep. 14, 2012; and
No. 2013-143468 filed Jul. 9, 2013.

BACKGROUND

1. Field of the Invention

This invention relates to a wheel of an electric wheelchair and a wheelchair including a small-size battery and, more particularly, to a wheel for a wheelchair and a wheelchair provided with a motor and an input sensor for detecting an input torque to a handrim.

2. Description of the Related Art

A wheelchair includes a frame, a seat attached to the frame, wheels mounted on the frame and handrims connected to the wheels. A user seated on the seat operates the handrims, whereby the wheels rotate. In such a wheelchair, a large force is necessary to rotate the wheels by operating the handrims. For example, the user is considerably tired in the case of moving the wheelchair over a long time or moving on a hill.

Wheelchairs mounted with a battery, a motor and a J/S controller have been utilized. With such a wheelchair, a user operates the J/S controller, whereby power is supplied from the battery to the motor. The motor rotates by the power from the battery to move the wheelchair. In the wheelchair provided with the battery and the motor, fatigue in moving the wheelchair can be drastically reduced. However, in such a wheelchair, all the power necessary for movement is supplied from the motor. In such a wheelchair, the battery, having a large capacity, is mounted in preparation for a case where the motor is driven for a long time. Thus, the weight of the entire wheelchair becomes heavier and it becomes difficult to lift the wheelchair. It is, for example, difficult to lift such a wheelchair and put it into an automotive vehicle.

A wheelchair provided with small-size battery and motor are being studied to prevent the wheelchair from becoming heavier and larger in size and reduce labor necessary to operate the wheelchair. In this wheelchair, part of the power necessary for movement is supplied from the motor as a user operates the handrims. In this wheelchair, the wheelchair is moved by power supplied from the motor in addition to a force applied from the user to operate the handrims (see JPH09-575A).

SUMMARY

Generally, a frame of a wheelchair is manufactured individually in accordance with the body shape of a user and the like. Wheels are mounted on the individually manufactured frame. In the wheelchair of JPH09-575A, motors extend inwardly in a wheelchair width direction from the wheels. Thus, in the case of mounting the wheels mounted on the wheelchair disclosed in JPH09-575A on another frame, the motors may come into contact with the frame. Thus, the shapes of frames on which the wheels of JPH09-575A can be mounted are limited.

To deal with such a problem, it is thought to arrange motors at outer sides in the wheelchair width direction. However, in this case, the motors are accommodated in hubs, leading to the enlargement of the hubs. Thus, the width of the wheelchair becomes larger.

In a power-assisted wheelchair provided with small battery and motors, rotational displacement detection mechanisms are provided which detect handrim operating forces. A rotational displacement detection mechanism of the wheelchair of JPH09-575A includes a rotary transformer and a potentiometer. Thus, an installation space of the rotational displacement detection mechanism is large and the hub is enlarged. Since the wheelchair is used not only outdoors, but also indoors, it is difficult to move the wheelchair if the wheelchair width becomes larger.

An object of an aspect consistent with the claimed invention is to provide a wheel provided with a rotational displacement detection mechanism and configured not to make a wheelchair width larger when being mounted on a frame.

According to a first aspect consistent with the claimed invention, there is provided a power-assisted wheel detachably mountable on a wheelchair, comprising: an axle to be supported on a frame of the wheelchair; a motor mounted on the axle; a hub including a wheel hub mounted on the axle and a handrim base section supported displaceably relative to the wheel hub; and a rotational displacement detection mechanism configured to detect a rotational displacement of the handrim base section relative to the wheel hub and having a center of rotation coinciding with an axle center of the motor.

According to a second aspect consistent with the claimed invention, there is provided a wheelchair, comprising: an axle to be supported on a frame of the wheelchair; a motor mounted on the axle; a hub including a wheel hub mounted on the axle and a handrim base section supported displaceably relative to the wheel hub; and a rotational displacement detection mechanism configured to detect a rotational displacement of the handrim base section relative to the wheel hub and having a center of rotation coinciding with an axle center of the motor.

The above and further objects and novel features consistent with the claimed invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 7 is a part drawing of the rotor.
FIG. 11 is an overall left side view of the hub showing a state where the wheel cover and the cover are removed.

DETAILED DESCRIPTION OF THE PREFERRED EMBODIMENTS

Figure 1:
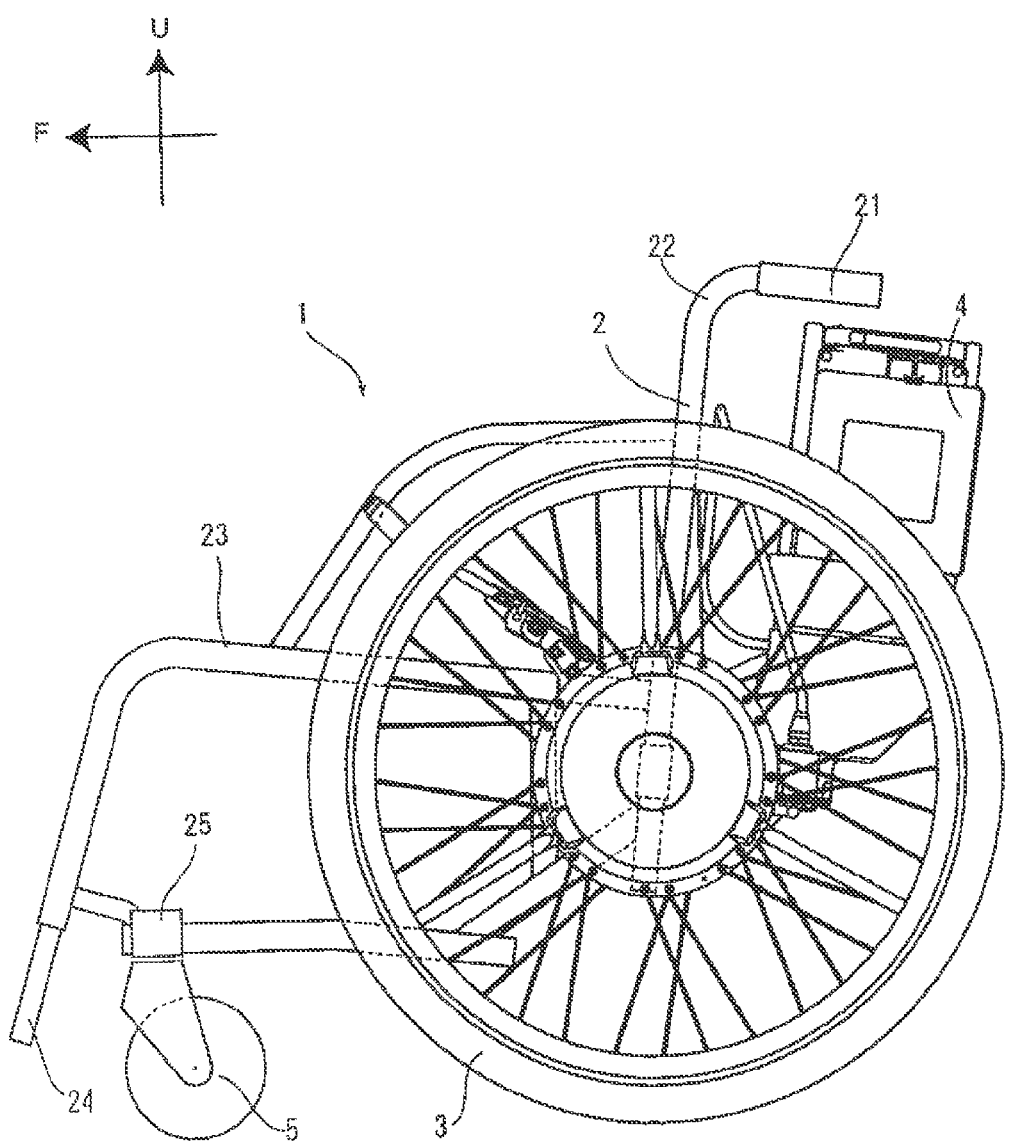
FIG. 1 is an overall left side view of the wheelchair.

Hereinafter, a wheelchair 1 according to one embodiment of an aspect consistent with the claimed invention is described with reference to the drawings. In the drawings, identical or corresponding components are denoted by the same reference signs and not repeatedly described. An arrow F in the drawings indicates a forward direction of the wheelchair 1. An arrow U in the drawings indicates an upward direction of the wheelchair 1. An arrow R in the drawings indicates a rightward direction of the wheelchair 1. An arrow L in the drawings indicates a leftward direction of the wheelchair 1.

<Overall Configuration of Wheelchair>

FIG. 1 is an overall left side view of the wheelchair 1 according to an aspect consistent with the claimed invention. Note that, in the case of indicating forward, backward, leftward and rightward directions in the following description, they mean forward, backward, leftward and rightward directions when viewed from a user seated on a seat of the wheelchair 1. A wheelchair width direction center means a width center of a wheelchair body in a horizontal direction. A wheelchair width direction outer side means a direction from the wheelchair width direction center toward a right or a left side. A wheelchair width direction inner side means a direction from the right or left side of the wheelchair body toward the wheelchair width direction center.

The wheelchair 1 includes a pair of left and right body frames 2, a pair of left and right wheels 3, a battery 4 and a pair of left and right front wheels 5. Since FIG. 1 is a side view, one body frame 2, one wheel 3 and one front wheel 5 are shown. The body frame 2 includes a handle 21, a handle support frame 22, a seat support frame 23, a footboard support frame 24 and a front wheel support frame 25. The handle 21 is gripped when a person other than the user operates the wheelchair 1. The handle 21 is located above the wheel 3. A part of the handle support frame 22 extends in a vertical direction. The seat support frame 23 supports a seat to be sat on by the user. The seat support frame 23 is inclined downward from a front side toward a back side. One end of the seat support frame 23 is fixed to the handle support frame 22. The footboard support frame 24 is provided on the other end of the seat support frame 23. The footboard support frame 24 is arranged before the front wheel 5. Note that, in FIG. 2, the seat support frame 23 is representatively shown by a seat rail which is a constituent element of the seat support frame 23. An unillustrated footboard is attached to the footboard support frame 24. The front wheel support frame 25 is located above the front wheel. The front wheel support frame 25 rotatably supports the front wheel 5.

The wheel 3 is supported on the body frame 2 and on the handle support frame 22. The battery 4 supplies power to a drive source of the wheel 3. A part of the battery 4 is arranged behind the body frame 2. A part of the battery 4 is located above the upper end of the wheel 3. The front wheel 5 has a diameter smaller than the wheel 3.

Figure 2:
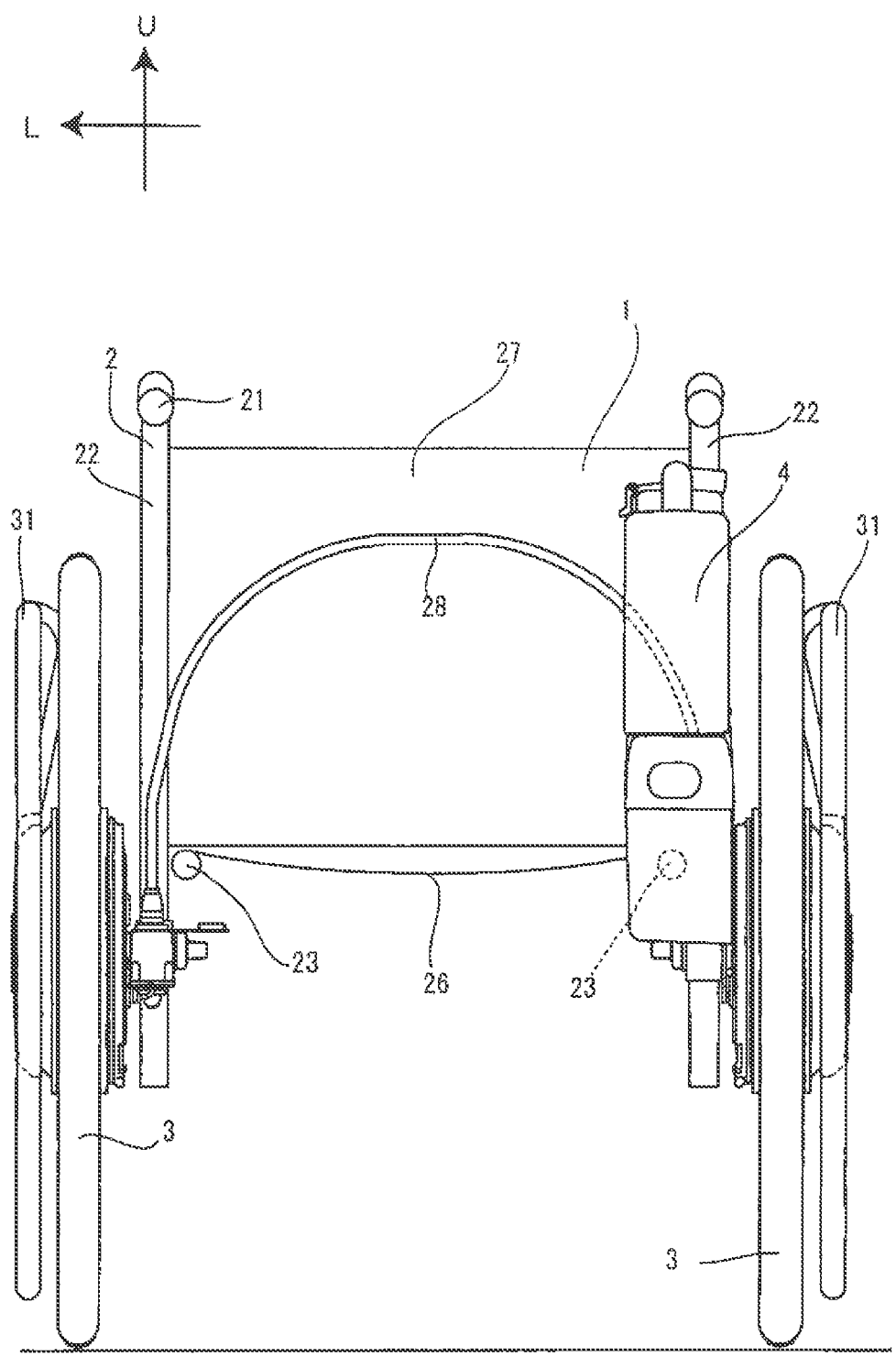
FIG. 2 is an overall rear view of the wheelchair.

FIG. 2 is an overall rear view of the wheelchair 1. The wheelchair 1 includes a seat 26 and a backrest 27. The seat 26 and the backrest 27 are arranged between the pair of left and right body frames 2. The seat 26 is arranged between the pair of left and right seat support frames 23. The backrest 27 is arranged between the pair of left and right handle support frames 22. The backrest 27 supports the back of the user seated on the seat 26 of the wheelchair 1. A cable for supplying power to a drive source of the left wheel 3 from the battery 4 and a cable 28 including a signal line for transmitting information of the left and right wheels are arranged between the left wheel 3 and the battery 4. The wheel 3 includes a handrim 31 integrally mounted and capable of detecting an operating force. The handrim 31 is operated by the user in moving the wheelchair 1. When the handrim 31 is operated by the user, the wheel 3 integrally rotates with the handrim 31. The handrim 31 is arranged at a wheelchair width direction outer side of the wheel 3.

Figure 3:
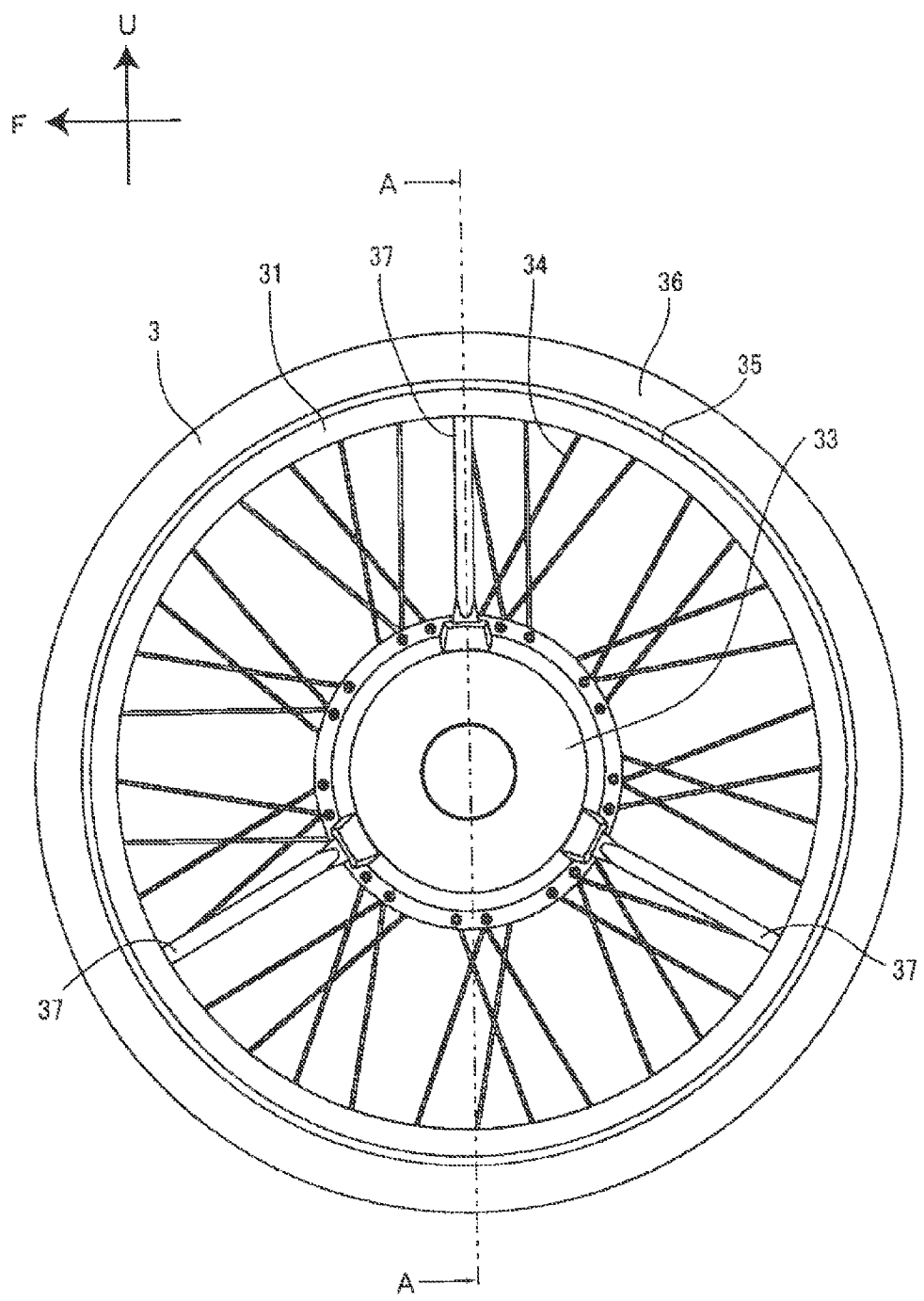
FIG. 3 is a left side view showing the left wheel.

FIG. 3 is a left side view showing the left wheel 3. In the following description, a radial inner side means a direction from the outer periphery of the wheel toward the center of the wheel in a side view. A radial outer side means a direction from the center of the wheel toward the outer periphery of the wheel. A circumferential direction means a direction along a circumference centered on an axle.

The wheel 3 includes a hub 33, spokes 34, a rim 35, a tire 36, the handrim 31 and connecting pipes 37. The hub 33 is arranged in the center of the wheel 3 in the side view. The spoke 34 is a wire-like member. A plurality of spokes 34 are arranged between the rim 35 and the hub 33. The rim 35 is arranged at a radial outer side of the spokes 34 in the side view. The rim 35 is annular in the side view. The tire 36 is arranged at an outer side of the rim 35 in a radial direction. The tire 36 is mounted on the rim 35. The tire 36 is annular in the side view. The handrim 31 is arranged at a radial outer side of the hub 33 in the side view. The handrim 31 is arranged at a radial inner side of the tire 36. The handrim 31 is annular in the side view. The connecting pipes 37 are arranged between the handrim 31 and the hub 33. Three connecting pipes 37 are arranged at equal intervals in the circumferential direction.

Figure 4:
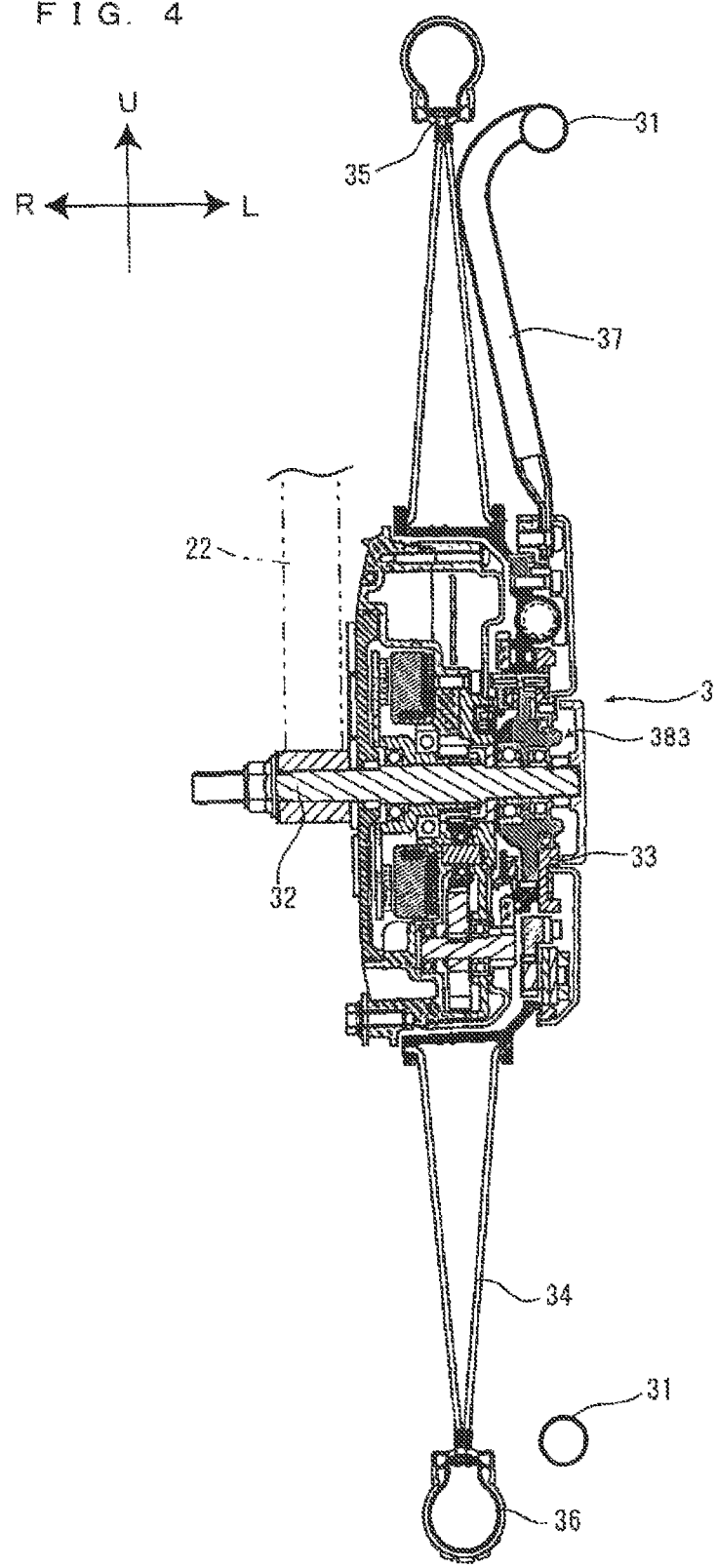
FIG. 4 is a sectional view taken along line A-A in FIG. 3.

FIG. 4 is a sectional view along line A-A in FIG. 3. FIG. 4 is a front sectional view of the left wheel 3 at a position passing through an axle 32. In the following description, an axial direction means an extending direction of the axle 32. For the sake of convenience, a side supported by the body frame 2 is referred to as an axial inner side of the wheel 3 and a direction away from the body frame 2 in the axial direction is referred to as an axial outer side of the wheel 3.

The wheel 3 includes the axle 32. One end of the axle 32 is fixed to the handle support frame 22. The axle 32 extends in a lateral direction in a front view. The hub 33 is relatively rotatably mounted on the axle 32. The spokes 34 are attached to the outer peripheral surface of the hub 33. The rim 35 is arranged on outer ends of the spokes 34 at one end in the radial direction. The handrim 31 is arranged at an outer side of the rim 35 in the axial direction substantially in parallel to the rim 35.

Figure 5:
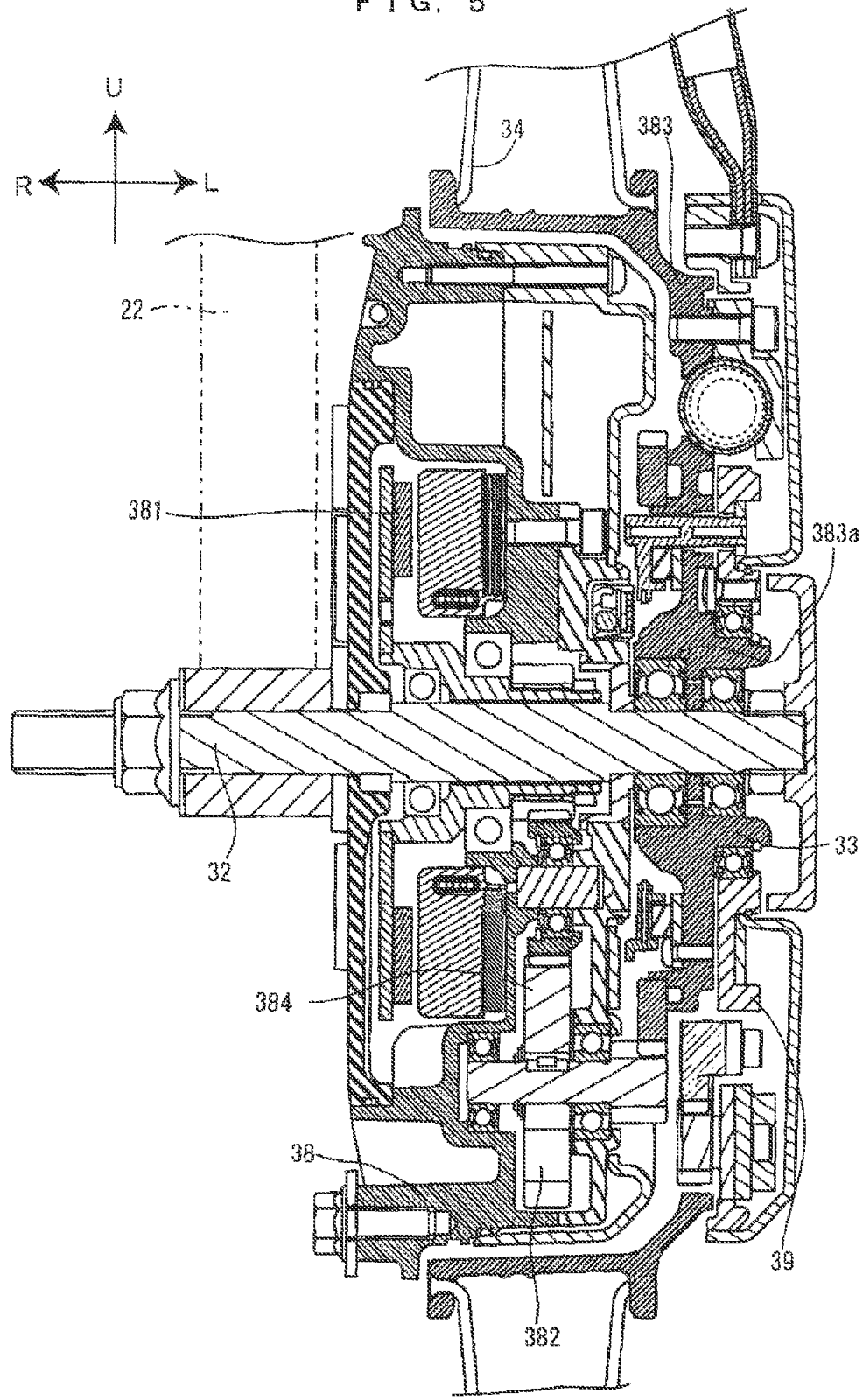
FIG. 5 is an enlarged front sectional view of the hub and a power unit.

FIG. 5 is an enlarged front sectional view of the hub 33 and a power unit 38. The power unit 38 is arranged at an inner side of a wheel hub 383. The hub 33 includes the wheel hub 383 and a handrim base section 39. The power unit 38 includes a motor 381 and a speed reduction mechanism 382.

The motor 381 is mounted in the power unit 38. The motor 381 is arranged substantially on the center of the axis 32 in the axial direction. The speed reduction mechanism 382 is arranged at an axial outer side of the motor 381. The speed reduction mechanism 382 transmits power output from the motor 381 to the wheel hub 383. The speed reduction mechanism 382 includes a gear train 384.

The wheel hub 383 is arranged at an axial outer side of the speed reduction mechanism 382. The wheel hub 383 is mounted on the axle 32 via a bearing 383a. The wheel hub 383 is rotatable relative to the axle 32. The spokes 34 are fixed to the outer periphery of the wheel hub 383.

Figure 6:
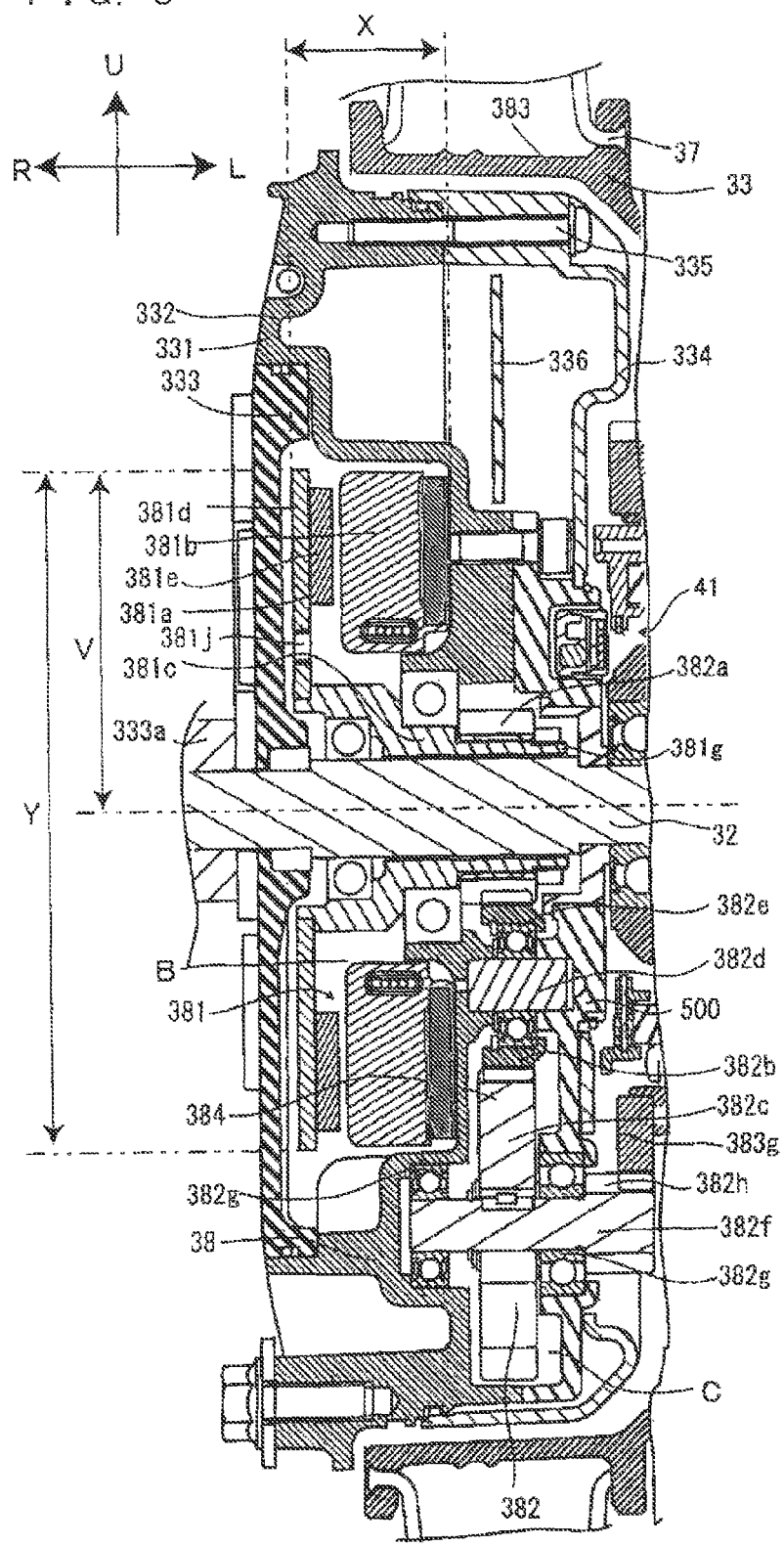
FIG. 6 is a partial enlarged sectional view of the power unit.

FIG. 6 is a partial enlarged sectional view of the power unit 38. The power unit 38 includes a housing 331. The housing 331 includes a first housing 332, a second housing 333 and a third housing 334. A space B is formed between the first housing 332 and the second housing 333. The motor 381 is accommodated in the space B. A space C is formed between the third housing 334 and the first housing 332. A control board 336 and the speed reduction mechanism 382 are arranged in the space C. The first housing 332 is arranged at an inner side of the third housing 334 in the axial direction. The third housing 334 is fixed to the first housing 332 by a bolt 335. The second housing 333 is fixed to the first housing 332. The power unit 38 is fixed to the frame by an unillustrated torque receiving member for receiving a motor rotation reaction force. The axle 32 is fixed to the power unit 38 by a structure for sandwiching the axle 32 by the second housing 333 and a support plate 500.

A width X of the motor 381 in the axial direction is smaller than an outer diameter Y of the motor 381 in the radial direction (diameter of the motor 381). The width X of the motor 381 in the axial direction is smaller than a radius V of the motor 381 in the radial direction. The motor 381 includes a rotor 381a and a stator 381b. The rotor 381a is rotatable relative to the axle 32. The rotor 381a includes a motor shaft 381c, a back yoke 381d and a magnet 381e. The motor shaft 381c is rotatably supported on the axle 32. The motor shaft 381c surrounds the outer periphery of a part of the axle 32. The back yoke 381d is fixed to an end of the motor shaft 381c at an axial inner side. The back yoke 381d is arranged near the second housing 333. The magnet 381e is fixed to the back yoke 381d. The magnet 381e is arranged at a predetermined distance from the stator 381b in the axial direction. The stator 381b is fixed to the first housing 332. The stator 381b is unrotatable relative to the axle 32. Since the motor 381 is a magnetic motor, a large torque can be output even if the axial width is made smaller and the radial width is made larger.

The speed reduction mechanism 382 includes a first gear 382a, a second gear 382b, a third gear 382c, a fourth gear 382h and a transmission gear 383g. The first gear 382a is fixed to the outer periphery of the motor shaft 381c. The second gear 382b is arranged outwardly of the first gear 382a in the radial direction. The second gear 382b is engaged with the first gear 382a. The second gear 382b is rotatably mounted on a shaft 382d via a bearing 382e. The shaft 382d is fixed to the first housing 332 and the support plate 500. The third gear 382c is arranged outwardly of the second gear 382b in the radial direction. A shaft 382f of the third gear 382c is rotatably supported on the first housing 332 and the support plate 500 via a bearing 382g. The third gear 382c rotates integrally with the shaft 382f. The third gear 382c is engaged with the second gear 382b. The third gear 382c has a diameter larger than the second gear 382b. The fourth gear 382h is fixed to the shaft 382f. The transmission gear 383g is engaged with the fourth gear 382h.

Further, as shown in FIG. 6, the motor 381 includes the rotor 381a and the stator 381b, and the rotor 381a includes the disk-like back yoke 381d (disk) centered on the axle 32. The annular stator 381b is arranged at a predetermined distance from the rotor 381a in the axial direction of the axle 32, and centered on the axle 32 in a side view of the wheelchair 1. Further, the rotor 381a includes a cylinder 381g surrounding a part of the side surface of the axle 32.

FIG. 7 is a part drawing of the rotor 381a. The back yoke 381d of the rotor 381a is a disk-like member centered on a motor rotary shaft. The back yoke 381d is formed with three holes 381j between the motor shaft 381c and the magnet 381e in the radial direction. The magnet 381e is an annular member. Magnetic poles of the magnet 381e are arranged in the circumferential direction. The magnet 381e is alternately magnetized to an N-pole and an S-pole in the circumferential direction.

Figure 8:
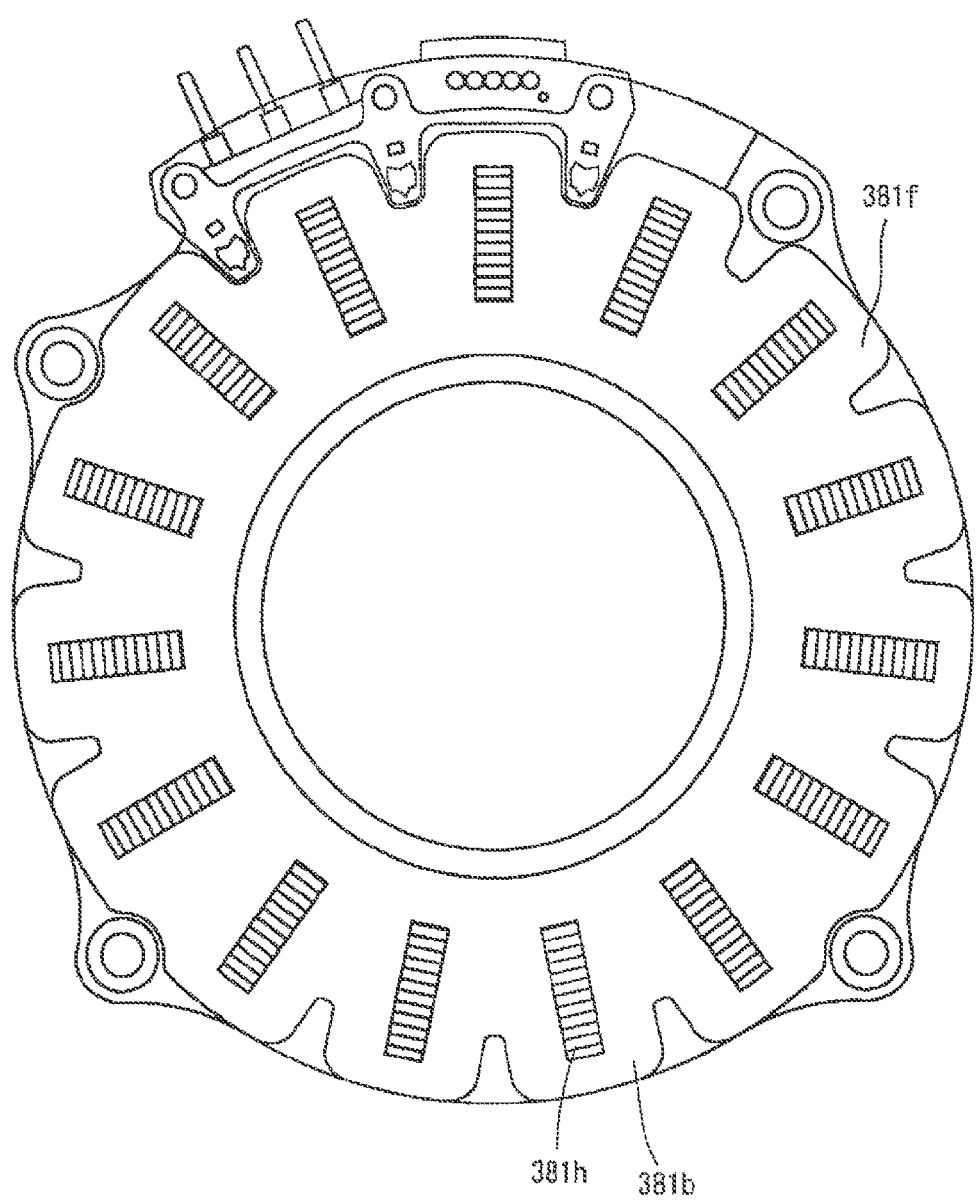
FIG. 8 is a part drawing of the stator.

FIG. 8 is a part drawing of the stator 381b. The stator 381b includes a stator core 381f. The stator 381b is formed with a plurality of teeth 381h. The plurality of teeth 381h are arranged at equal intervals in the circumferential direction. An unillustrated coil is wound around the teeth 381h.

Figure 9:
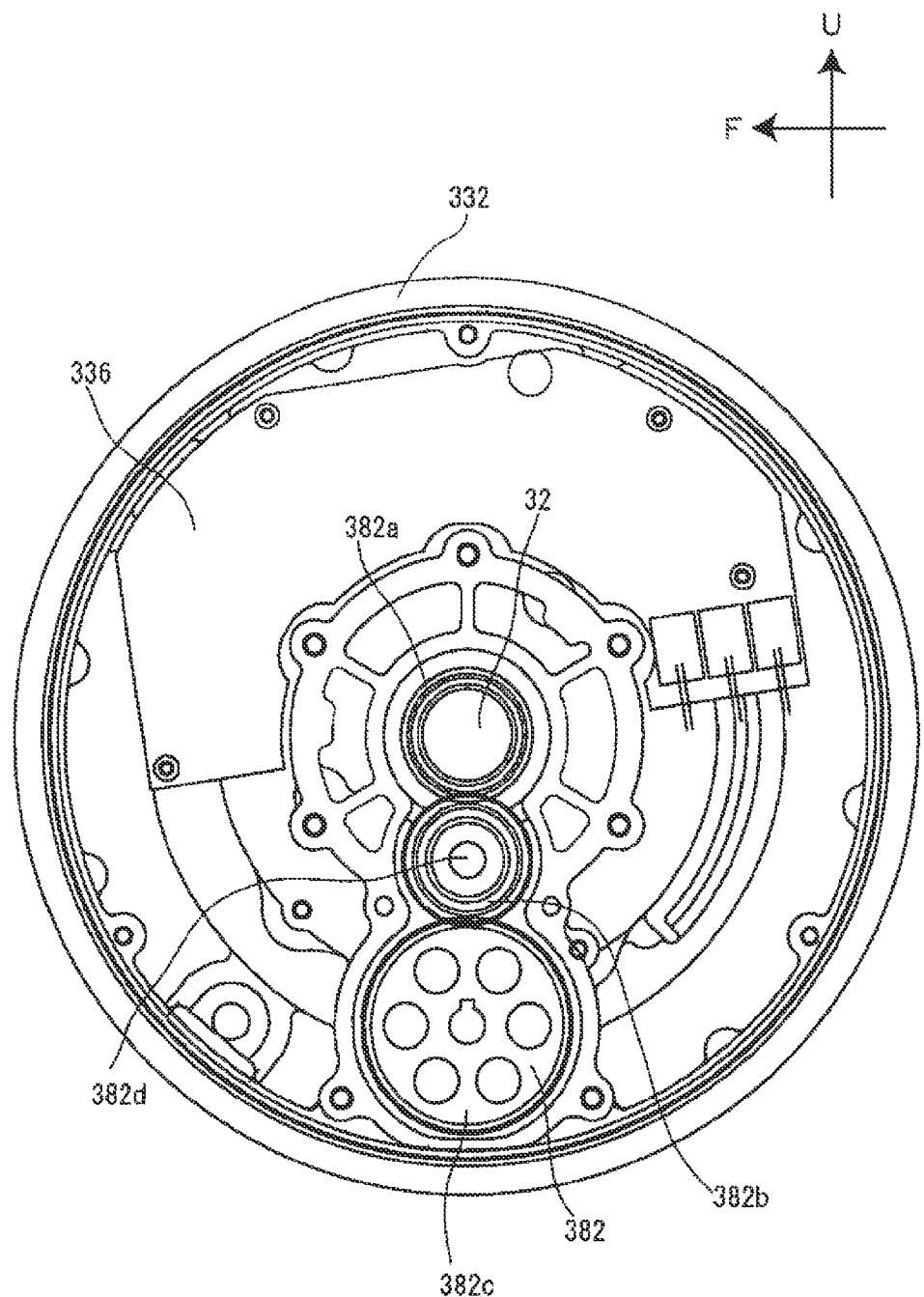
FIG. 9 is a left side view of the power unit in a state where the bolt is removed and the third housing and the support plate are removed from the first housing.

FIG. 9 is a left side view of the power unit 38 in a state where the bolt 335 (see FIG. 6) is removed and the third housing 334 and the support plate 500 are removed from the first housing 332. The first, second and third gears 382a, 382b and 382c included in the speed reduction mechanism 382 are arranged on a straight line. The first, second and third gears 382a, 382b and 382c are arranged from the radial inner side toward the radial outer side.

Figure 10:
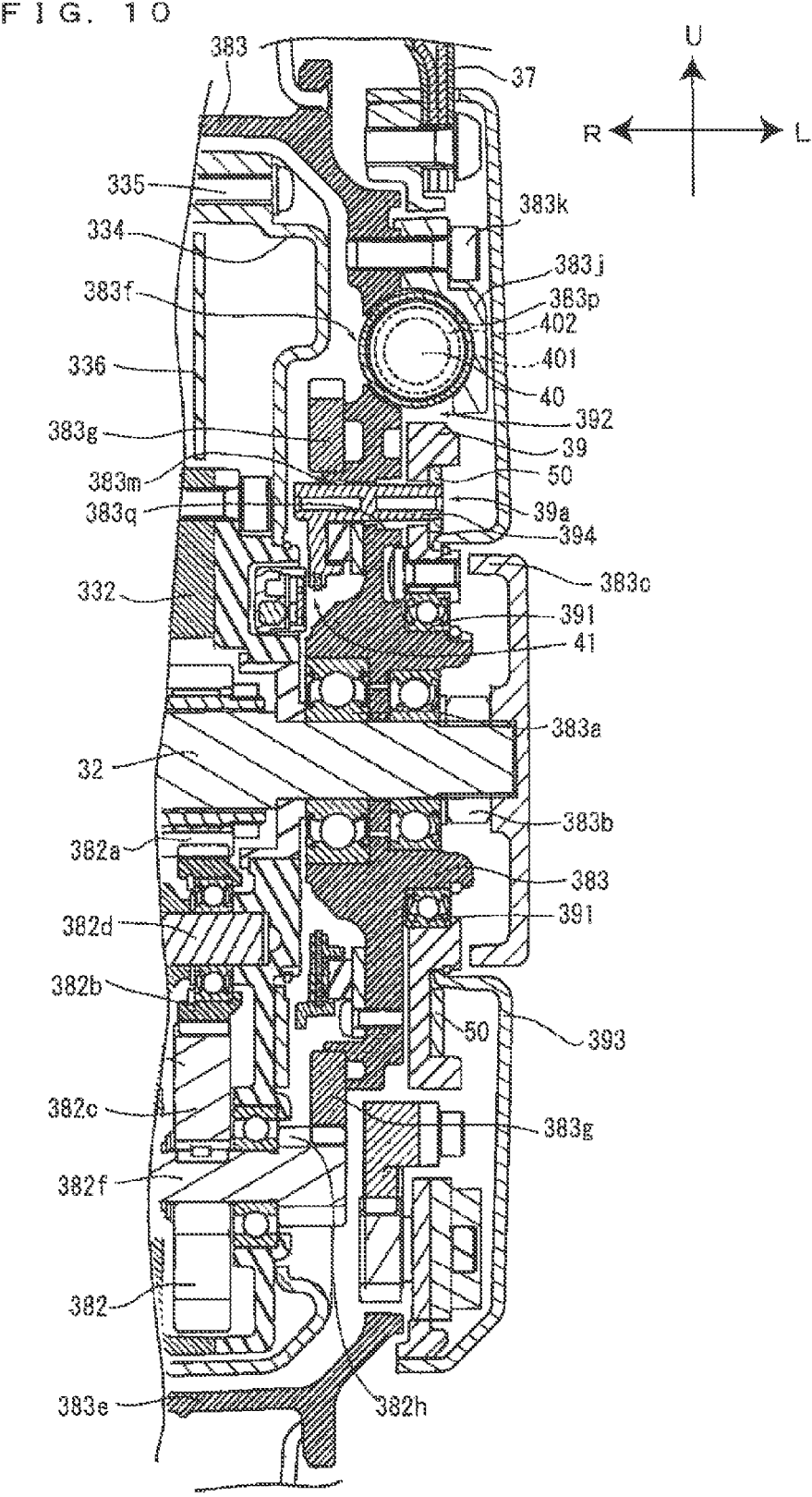
FIG. 10 is a partial enlarged view of the hub showing a configuration around the handrim base section.

FIG. 10 is a partial enlarged view of the hub 33 showing a configuration around the handrim base section 39. The handrim base section 39 is mounted on the axle 32 via the wheel hub 383. The wheel hub 383 is arranged at an axial outer side of the third housing 334. The handrim base section 39 is arranged at an axial outer side of the wheel hub 383. The wheel hub 383 is rotatably mounted on the axle 32 via the bearing 383a. A nut 383b is provided at an axial outer side of the bearing 383a. The position of the wheel hub 383 in the axial direction is fixed by the nut 383b. A cover 383c is provided at an axial outer side of the nut 383b, so that the nut 383b cannot be seen from the outside of the hub 33. The wheel hub 383 is rotatable relative to the axle 32. The outer peripheral end of the wheel hub 383 is bent toward an axial inner side to form a cylinder section 383e. The cylinder 383e extends in the axial direction. The spokes 34 are fixed to the cylinder 383e. A spring holding surface 383f is formed on the wheel hub 383. A coil spring 40 is arranged on the spring holding surface 383f. The spring holding surface 383f is a cylindrical surface in conformity with the shape of the coil spring 40. A spring cover 383j is fixed to the wheel hub 383. The spring cover 383j is fixed to the wheel hub 383 by a screw 383k. The spring cover 383j covers the coil spring 40 from an axial outer side with respect to the axial direction of the axle 32. The spring cover 383j is formed with a cylindrical support surface 383p in conformity with the shape of a part of the coil spring 40. The coil spring 40 includes a large spring 401 and a small spring 402. The small spring 402 is arranged inside the large spring 401. The wheel hub 383 includes the transmission gear 383g. The fourth gear 382h is formed on the shaft 382f of the third gear 382c of the speed reduction mechanism 382. The transmission gear 383g is engaged with the fourth gear 382h. The transmission gear 383g is located at an inner side of the fourth gear 382h in the radial direction.

The handrim base section 39 is pivotably mounted on the wheel hub 383 via a bearing section 391. One end of the connecting pipe 37 at the radial inner side is fixed to the handrim base section 39. Thus, the handrim base section 39 is displaced if the handrim 31 (see FIG. 2) is rotated. The handrim base section 39 is formed with a spring support section 392. The spring support section 392 is arranged between the spring cover 383j and the spring holding section 383f in the axial direction of the axle 32. The coil spring 40 is arranged in the spring support section 392. A wheel cover 393 is mounted at an axial outer side of the handrim base section 39.

FIG. 11 is an overall left side view of the hub 33 showing a state where the wheel cover 393 and the cover 383c are removed. In FIG. 11, the connecting pipes 37, the handrim 31 and other components are not shown for the convenience of description.

The spring holding surface 383f of the wheel hub 383 and the spring support section 392 of the handrim base section 39 are located at the same position in the circumferential direction and radial directions. Three spring holding surfaces 383f and three spring support sections 392 are arranged at equal intervals in the circumferential direction. An arcuate through hole 383m and an arcuate groove 383q are provided at a radial inner side of the spring holding surface 383f of the wheel hub 383. The through hole 383f is formed in the groove 383q. The groove 383q extends in the circumferential direction. An annular groove 39a is formed inwardly of the spring support sections 392 of the handrim base section 39 in the radial direction. The annular groove 39a is arranged at a position overlapping the through holes 383m and the grooves 383q in the radial direction. An annular plate 50 is arranged in the annular groove 39a. The annular plate 50 is fixed to the handrim base section 39 by a bolt 51. The bolt 51 is arranged in a boss section 51a inside the groove 383q. A pin 394 is arranged inside the groove 383q and the through hole 383m.

Figure 12:
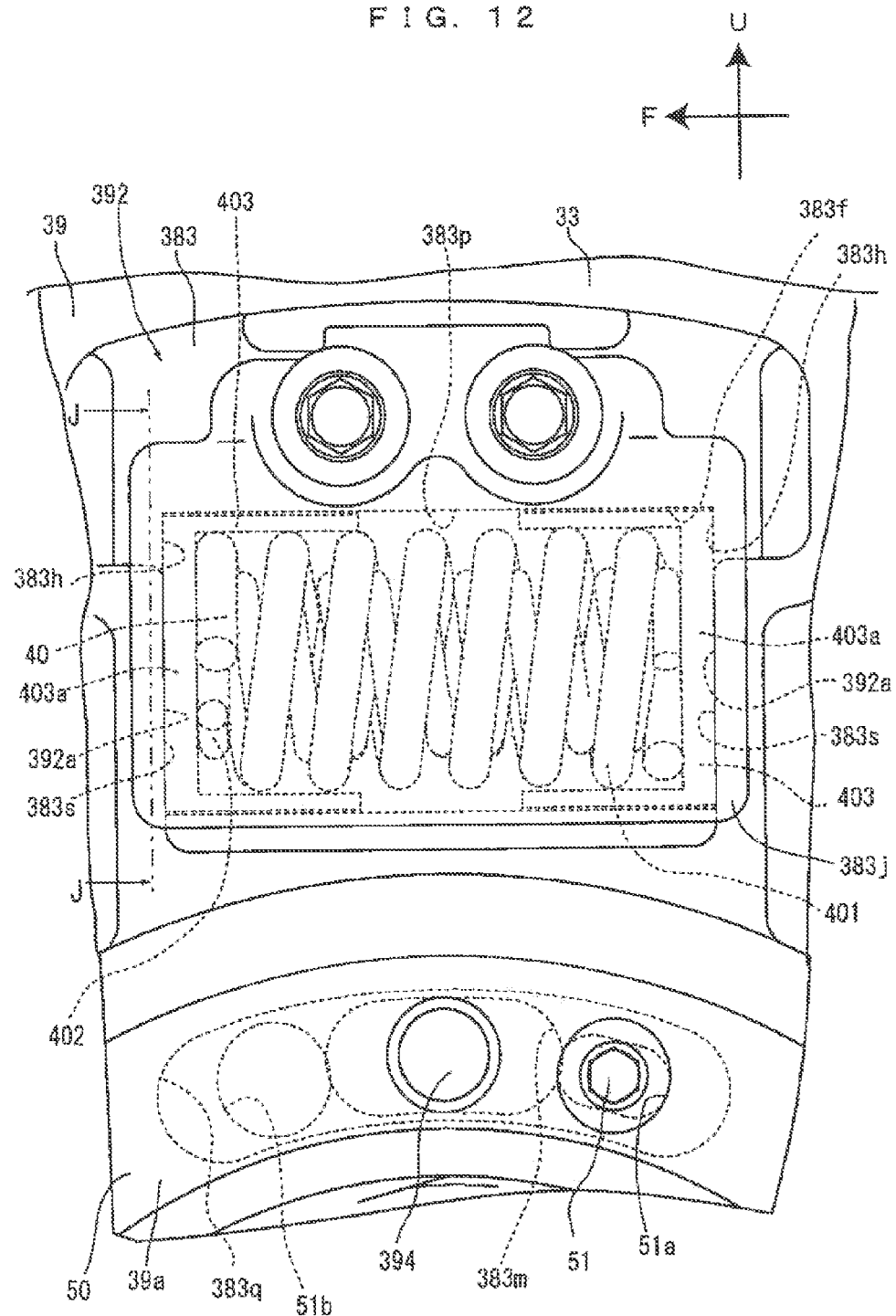
FIG. 12 is a partial enlarged view of FIG. 11.

FIG. 12 is a partial enlarged view of FIG. 11. FIG. 12 is a view enlargedly showing the surrounding of the coil spring 40. A pair of sliders 403 are arranged at opposite ends of the coil spring 40. The slider 403 is a cylinder member having a disk-like bottom 403a on one end. The large coil spring 401 and the small coil spring 402 are arranged at inner peripheral sides of the two sliders 403 arranged to face each other. The spring holding surface 383f and the support surface 383p of the spring cover 383j are formed to be cylindrical as described above. Thus, a substantially cylindrical space is formed by the spring holding surface 383f and the support surface 383p of the spring cover 383j. The sliders 403 are slidable in the cylindrical space. The support surface 383p includes end surfaces 383s corresponding to the bottoms of cylinders. The spring holding surface 383f includes end surfaces 383h corresponding to the bottoms of the cylinders. The spring support section 392 includes support ends 392a which can come into contact with the sliders 403. A part of the bottom 403a of the slider 403 is in contact with the end surface 383h of the spring holding surface 383f. Another part of the bottom 403a of the slider 403 is in contact with the end surface 383s of the support surface 383p. Still another part of the bottom 403a of the slider 403 is in contact with the support end 392a of the spring support section 392. Thus, a front/back rotational position of the coil spring 40 in the circumferential direction is determined at a neutral point thereof by the support ends 392a of the spring support section 392, the end surfaces 383s of the support surface 383p and the end surfaces 383h of the spring holding surface 383f.

The boss section 51a is formed around the bolt 51. A boss section 51b is arranged at a position symmetrical with the boss section 51a across the pin 394. The boss sections 51a, 51b are integrally formed to the handrim base section 39.

Figure 13:
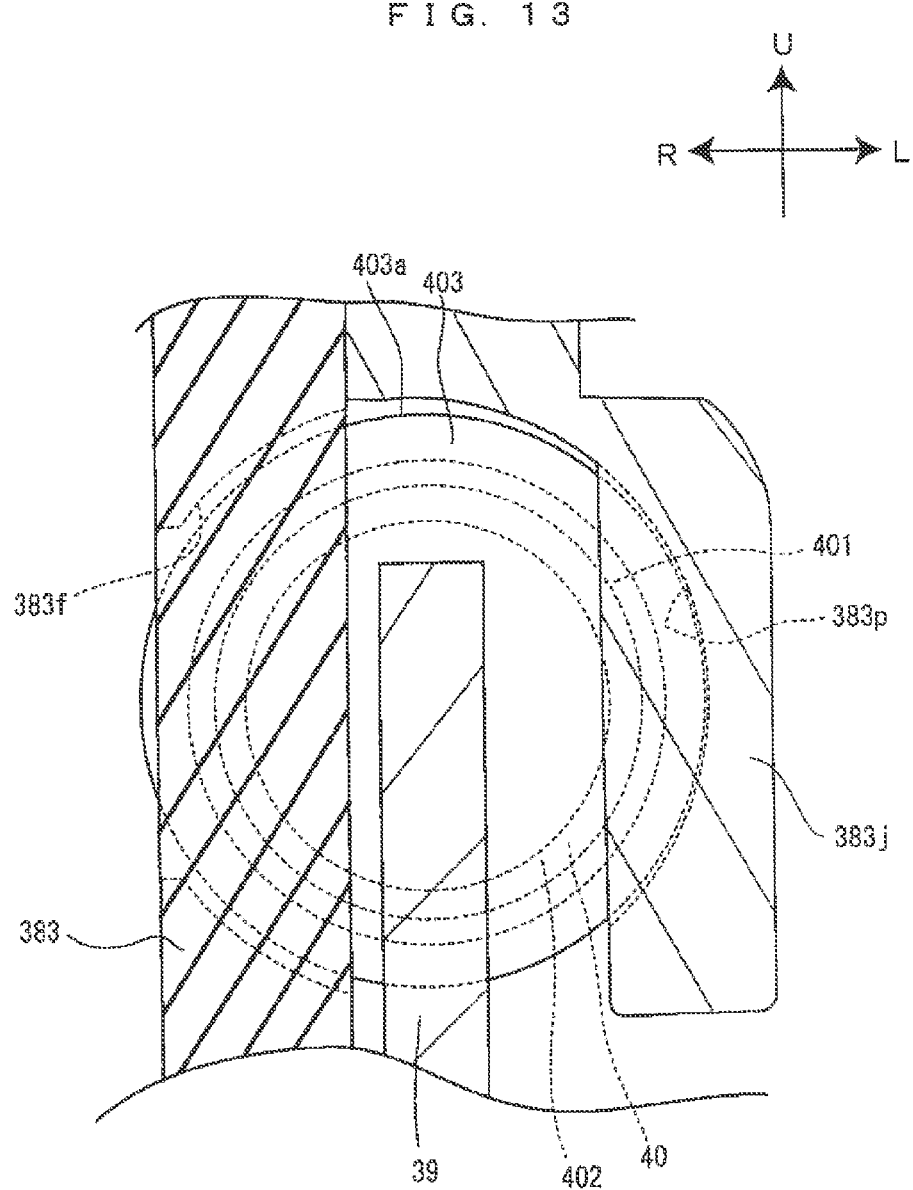
FIG. 13 is a sectional view taken along line J-J of FIG. 12.

FIG. 13 is a sectional view along line J-J of FIG. 12. In FIG. 13, detailed configurations of the wheel hub 383, the handrim base section 39, the coil spring 40 and the spring cover 383j are not shown for the convenience of description. The bottom 403a of the slider 403 is in contact with the wheel hub 383, the handrim base section 39 and the spring cover 383j in this order from the axial inner side toward the axial outer side of the axle 32. The outer surface of the slider 403 in the axial direction of the axle 32 can come into contact with the support surface 383p of the spring cover 383j. The inner surface of the slider 403 in the axial direction of the axle can come into contact with the spring holding surface 383f of the wheel hub 383. Thus, the position of the coil spring 40 in the axial direction is determined by the support surfaces 383p of the spring cover 383j and the spring holding surfaces 383f of the wheel hub 383.

Figure 14:
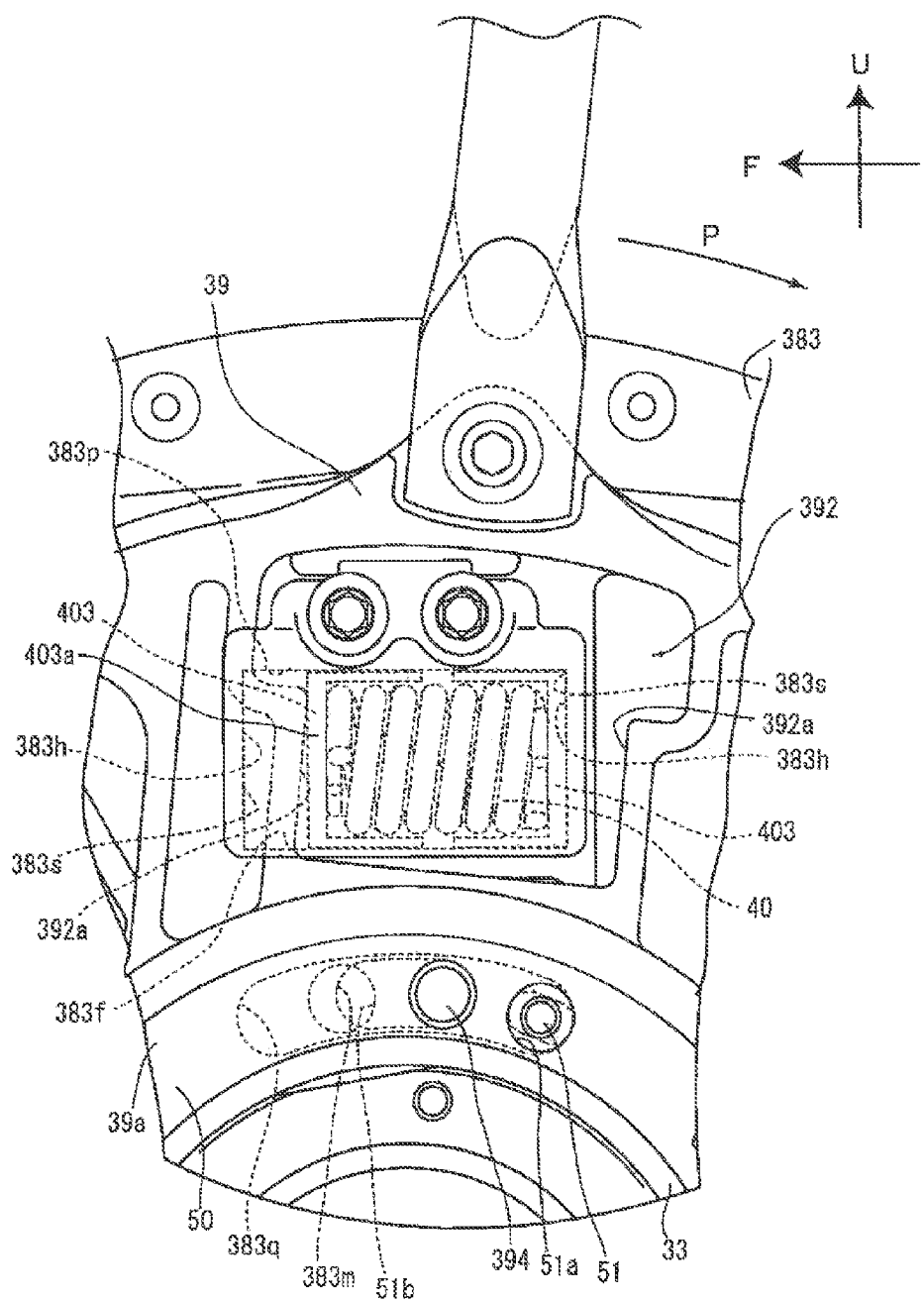
FIG. 14 is a partial enlarged side view showing a state around the coil spring when the handrim base section is rotationally displaced relative to the wheel hub.

FIG. 14 is a partial enlarged side view showing a state around the coil spring 40 when the handrim base section 39 is rotationally displaced relative to the wheel hub 383. In FIG. 14, the handrim base section 39 is rotated in a direction of an arrow P. FIG. 14 shows a state where the handrim base section 39 is rotated relative to the wheel hub 383 to a point where the boss section 51a around the bolt 51 comes into contact with the edge of the arcuate groove 383q. In this state, a small space is defined between the pin 394 and the edge of the through hole 383m and the pin 394 is not in contact with the edge of the through hole 383m. When the handrim base section 39 is rotated by a predetermined amount in the direction of the arrow P, the boss section 51a comes into contact with the edge of the groove 383*q*. Thus, the handrim base section 39 cannot rotate in the direction of the arrow P from the state of FIG. 14. Similarly, also in the case of rotating the handrim base section 39 in a direction opposite to the arrow P, the handrim base section 39 cannot rotate beyond a point where the boss section 51*b* comes into contact with the edge of the groove 383*q*. In this way, the relative rotation of the handrim base section 39 and the wheel hub 383 is limited to a predetermined range by the groove 383*q* and the boss sections 51*a*, 51*b*. If the handrim base section 39 rotates backward (direction of the arrow P) relative to the wheel hub 383 in the state of FIG. 12, distances from the support ends 392*a* of the spring support section 392 to the end surfaces 383*h* of the spring holding surface 383*f* and the end surfaces 383*s* of the support surface 383*p* are shortened. In this way, the coil spring 40 is compressed by the support ends 392*a* of the spring support section 392, the end surfaces 383*h* of the spring holding surface 383*f* and the end surfaces 383*s* of the support surface 383*p*. The support plate 500, the wheel hub 383 and the handrim base section 39 are provided with a rotational displacement detection mechanism 41 for detecting rotational displacements of the handrim base section 39 relative to the wheel hub 383. The configuration of the rotational displacement detection mechanism 41 is described below with reference to FIG. 15.

Figure 15:
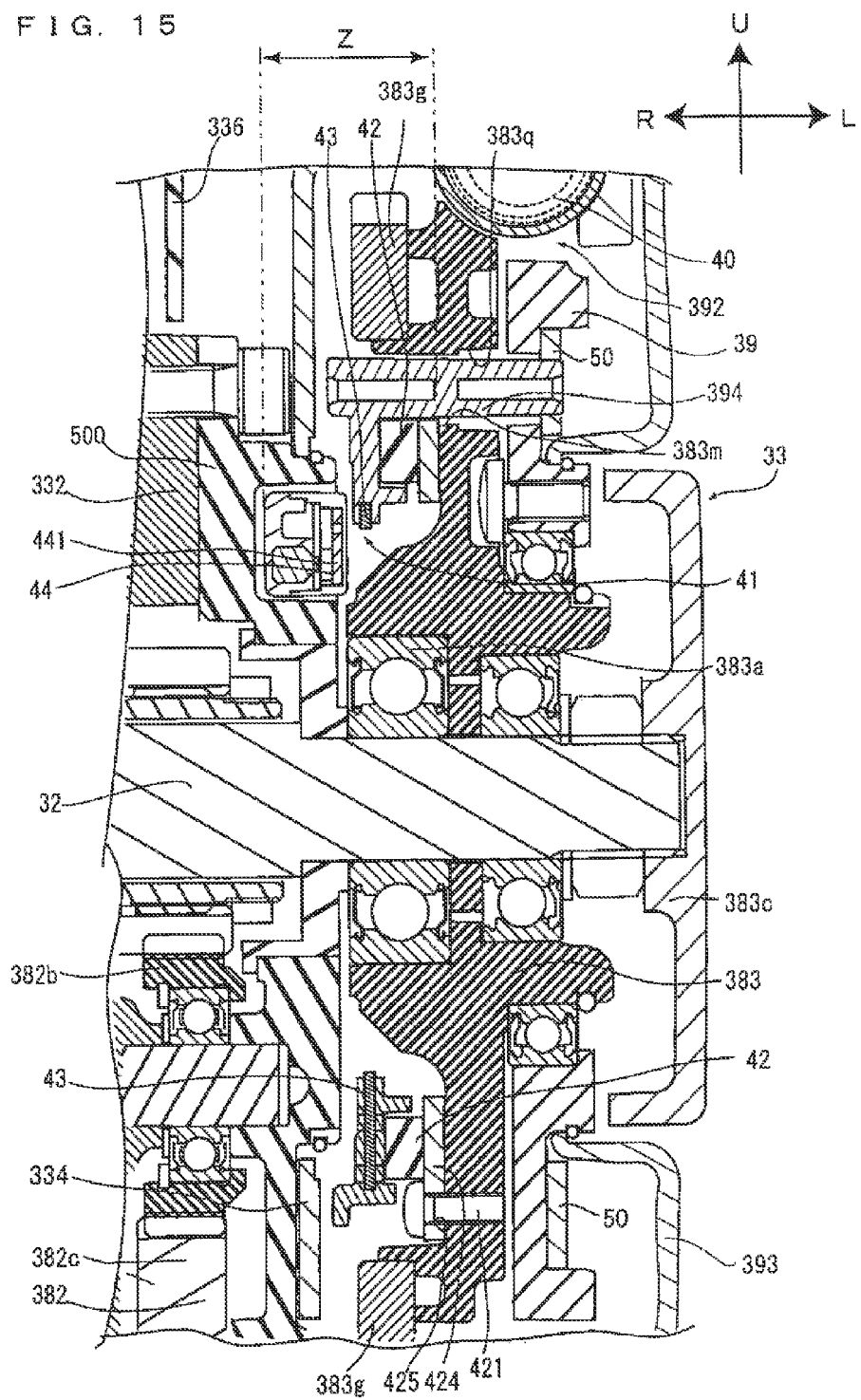
FIG. 15 is a partial enlarged front view of the hub showing the surrounding of the rotational displacement detection mechanism.

FIG. 15 is a partial enlarged front view of the hub 33 showing the surrounding of the rotational displacement detection mechanism 41. Members included in a magneto electric converter of the rotational displacement detection mechanism 41 are arranged within a width Z in the axial direction. The width Z (corresponding to an axial width of a rotational displacement detection mechanism of an aspect consistent with the claimed invention) of the rotational displacement detection mechanism 41 in the axial direction is smaller than the width X (see FIG. 6) of the motor 381 in the axial direction. The rotational displacement detection mechanism 41 includes an annular magnet 42, an annular plate 43 and a detection element 44. The annular magnet 42 is mounted on the wheel hub 383 by screws 421. The annular magnet 42 is arranged inwardly of the transmission gear 383*g* in the radial direction. An inner diameter of the annular plate 43 is located inwardly of the annular magnet 42 in the radial direction (see upper side of FIG. 15). A part of the annular plate 43 is arranged at a position overlapping the annular magnet 42 in the radial direction (see lower side of FIG. 15). The annular plate 43 is integral to the pins 394 fitted into the plate 50 fixed to the handrim base section 39 by the bolts 51. Thus, the annular plate 43 rotates relative to the power unit 38 together with the handrim base section 39. The pin 394 penetrates through the wheel hub 383 in the axial direction. The detection element 44 is a so-called Hall element. The detection element 44 is capable of detecting magnetism. The detection element 44 converts the detected magnetism into an electrical signal and outputs it to a controller. The detection element 44 is fixed to the support plate 500. The detection element 44 is positioned at an inner side of the annular plate 43 in the axial direction. The detection element 44 is located inwardly of the annular magnet 42 and the annular plate 43 in the radial direction. A metal plate 441 is arranged at an axial outer side of the detection element 44. The metal plate 441 overlaps a part of the annular plate 43 in the radial direction. Thus, the detection element 44 does not directly detect magnetism from the annular magnet 42 and detects magnetism via the annular plate 43 and the metal plate 441. The magnetism detected by the detection element 44 is output as an electrical signal to the controller.

Figure 16:
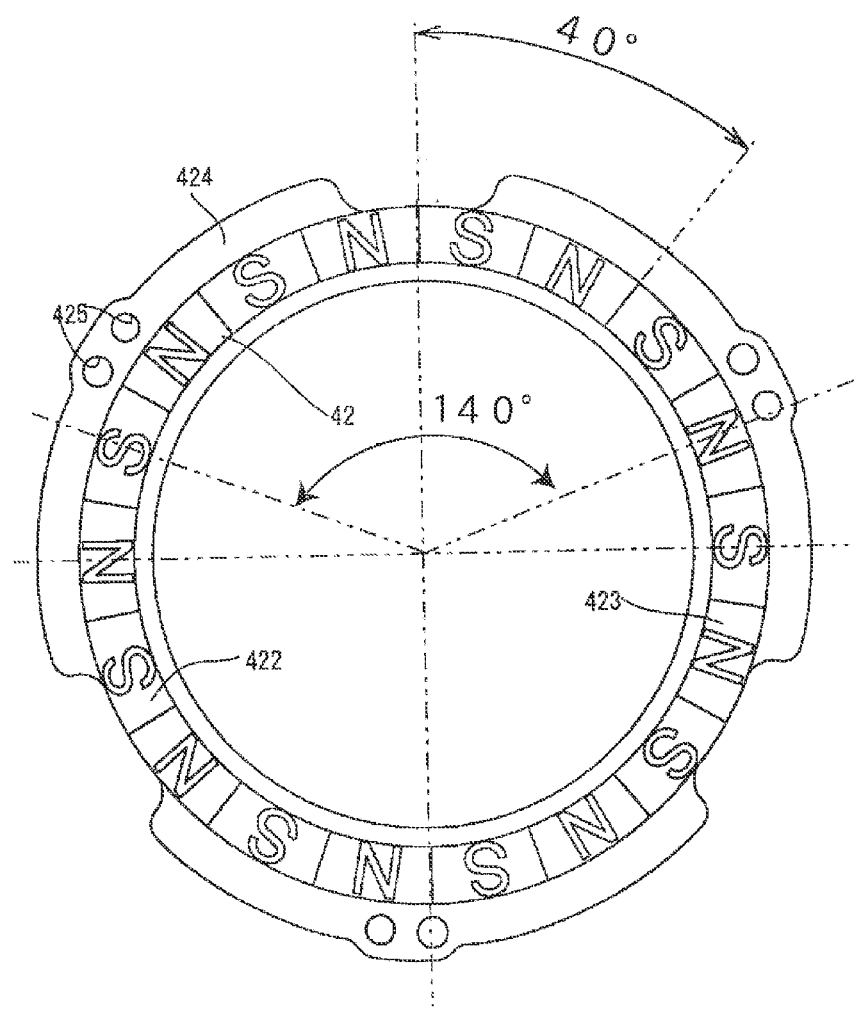
FIG. 16 is a part drawing of the annular magnet.

FIG. 16 is a part drawing of the annular magnet 42. S-poles 422 and N-poles 423 are alternately arranged in the circumferential direction in the annular magnet 42. Nine S-poles 422 and nine N-poles 423 are provided in the annular magnet 42. The annular magnet 42 includes a fixed plate 424. The fixed plate 424 is a part for fixing the annular magnet 42 to the wheel hub 383. The fixed plate 424 is formed with holes 425 (mounting holes and knock holes). In mounting the annular magnet 42 on the wheel hub 383, knock pins are inserted into the knock holes and fixed by screws 421.

Figure 17:
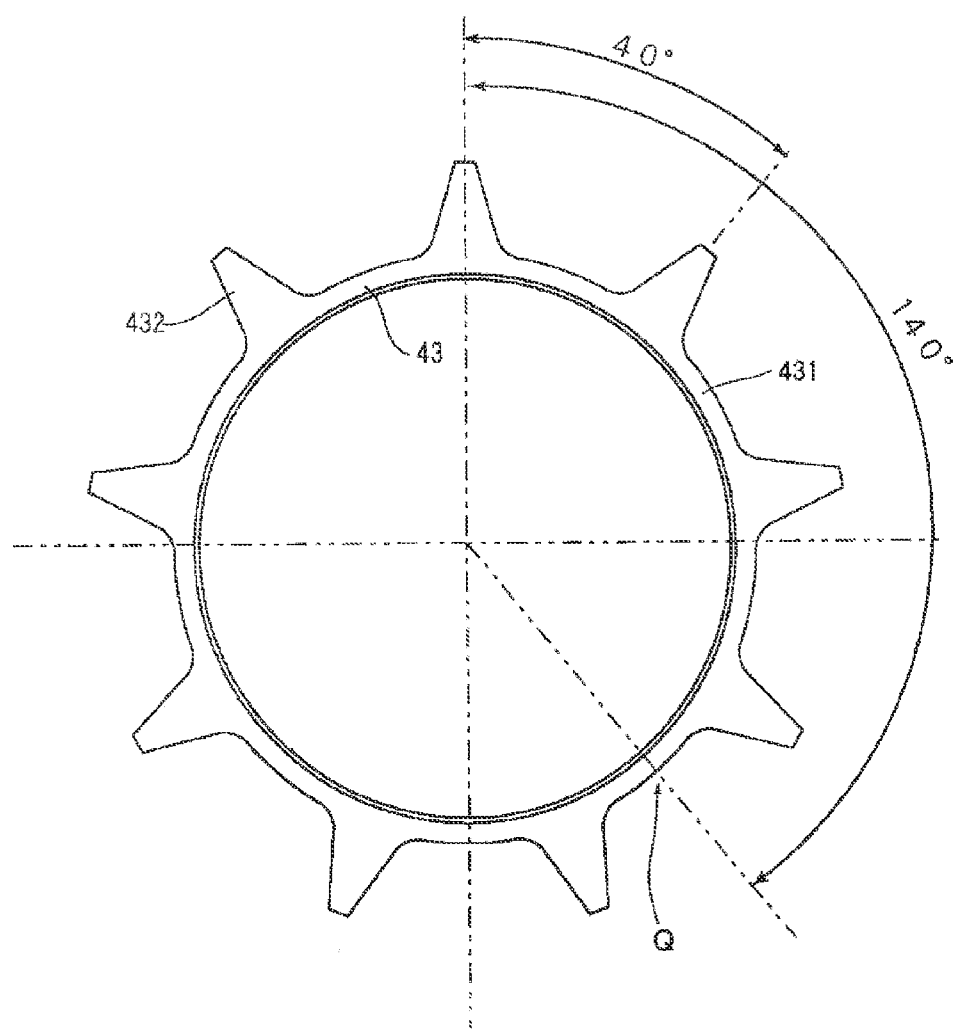
FIG. 17 is a part drawing of the annular plate.

FIG. 17 is a part drawing of the annular plate 43. The annular plate 43 includes a base section 431 and nine protrusions 432. The base section 431 is annular. The base section 431 is arranged at a position overlapping the metal plate 441 in the radial direction (see FIG. 15). A width of the base section 431 is smaller than that of the protrusions 432 in the radial direction. The protrusions 432 extend radially outward from the base section 431. The protrusions 432 are arranged at equal intervals in the circumferential direction. Nine protrusions 432 are arranged at an interval of 40° in the circumferential direction. The protrusions 432 are arranged at positions overlapping the annular magnet 42 in the radial direction.

Figure 18:
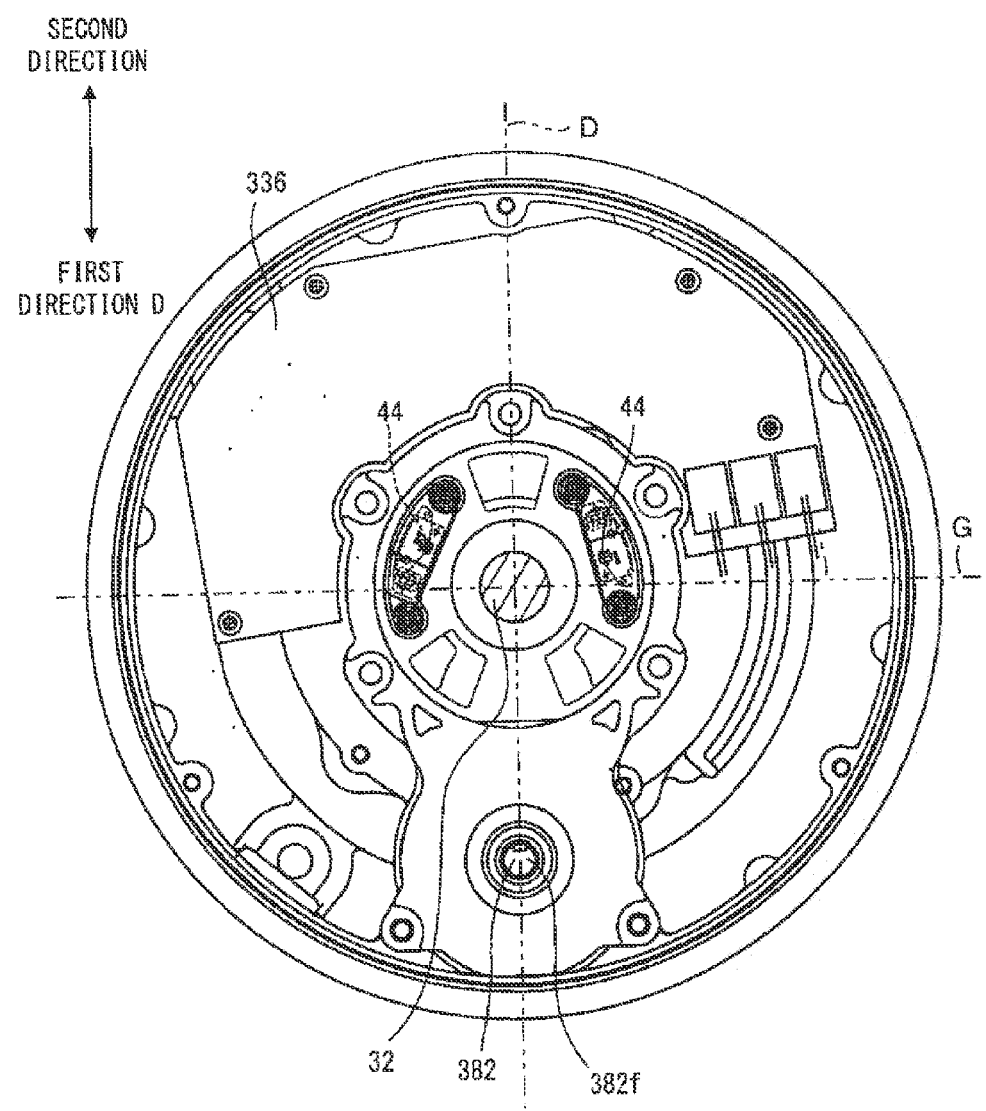
FIG. 18 is an overall side view of the power unit in a state where the third housing is removed from the power unit.

FIG. 18 is an overall side view of the power unit 38 in a state where the third housing 334 is removed from the power unit 38. A chain double-dashed line D in FIG. 18 indicates a first direction in which the gears of the speed reduction mechanism 382 are aligned. A chain double-dashed line G indicates a line passing through the center of the wheel 3 and extending in a direction perpendicular to the chain double-dashed line D in a plane in which the wheel 3 is arranged. Two detection elements 44 are fixed around the axle 32. An extending direction of the reduction mechanism 382 is the first direction (chain double-dashed line D). The pair of detection elements 44 are arranged at positions substantially symmetrical with respect to the chain double-dashed line D in a front-back direction.

Figure 19:
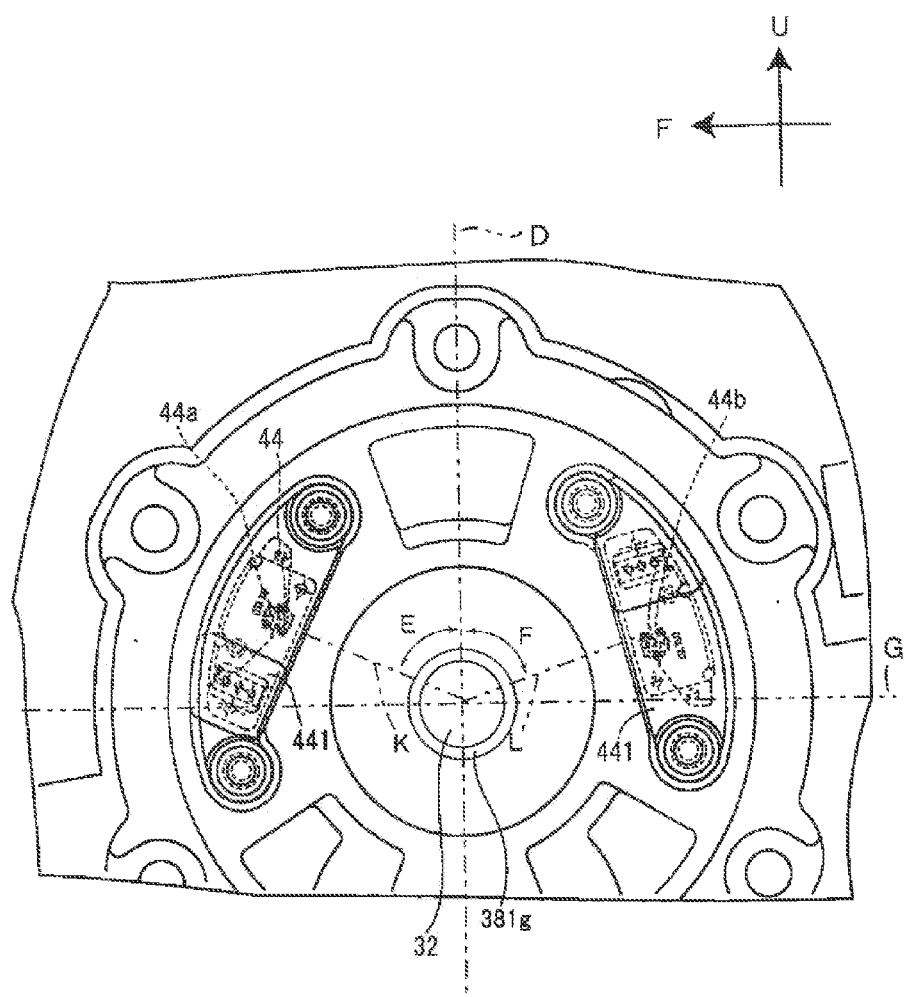
FIG. 19 is a partial enlarged view of FIG. 18.

FIG. 19 is a partial enlarged view of FIG. 18. FIG. 19 shows the surrounding of the pair of detection elements 44. A line passing through the centers of one detection element 44*a* and the axle 32 is a line K. A line passing through the centers of the other detection element 44*b* and the axle 32 is a line L. The sum of an angle E formed between the line K and the first direction D and an angle F formed between the line L and the first direction D is 140° (=E+F).

Since the pair of detection elements 44 are arranged at an interval of 140°, the S-pole 422 of the annular magnet 42 is arranged at an axial outer side of the other detection element 44*b* (see FIG. 16), for example, if the N-pole 423 of the annular magnet 42 is located at an axial outer side of the one detection element 44*a*. Voltages of electrical signals output from the respective detection elements 44*a*, 44*b* are added in the controller. For example, in a state where the protrusion 432 is located at the axial outer side of the one detection element 44*a*, the other detection element 44*b* is located between adjacent protrusions 432 when viewed from the axial outer side (see position Q of FIG. 17).

Further, as shown in FIG. 19, the detection element 44*a* (first element) and the detection element 44*b* (second element) are arranged radially outwardly of the cylinder 381*g* provided on the side surface of the axle 32. Since the detection elements 44*a*, 44*b* are arranged around the cylinder 381*g* in this way, the detection elements 44*a*, 44*b* can overlap the cylinder 381*g* in the axial direction. Thus, the thickness of the entire wheel can be made smaller as compared with a configuration in which the detection elements 44*a*, 44*b* do not overlap the cylinder 381*g* in the axial direction.

Figure 20:
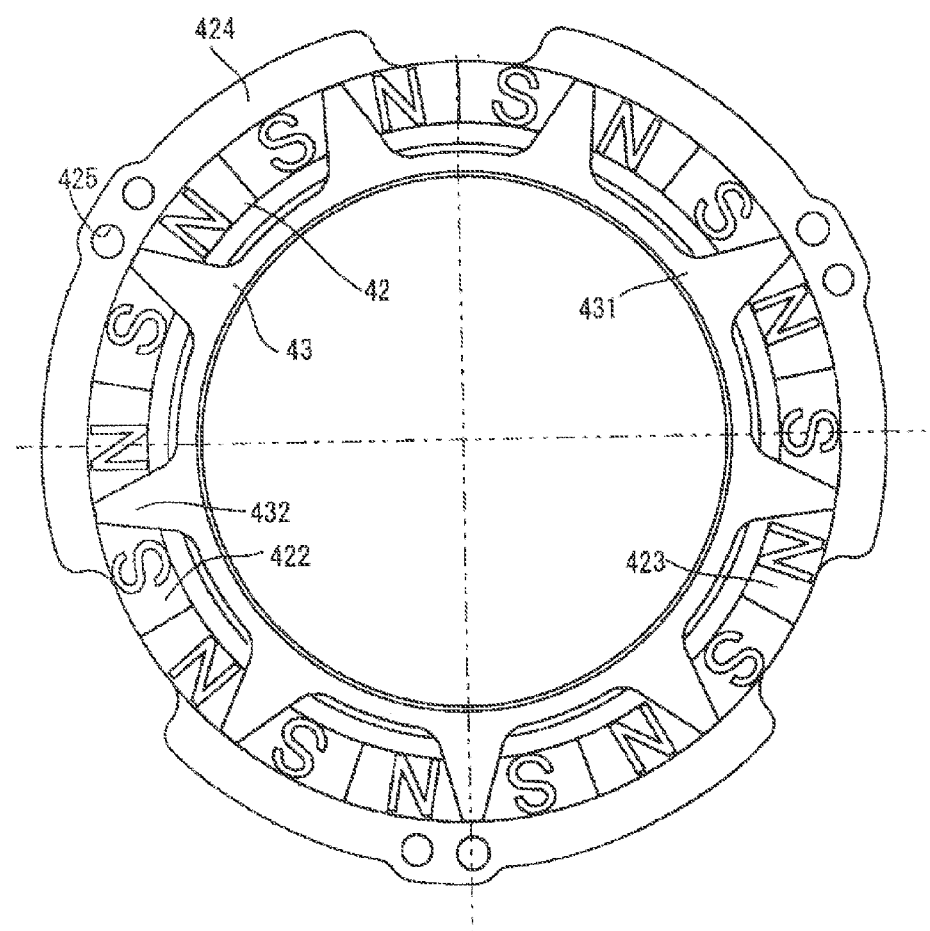
FIG. 20 is a schematic diagram showing a positional relationship of the annular magnet and the annular plate 43 in a state where the annular plate is not rotated relative to the annular magnet.
Figure 21:
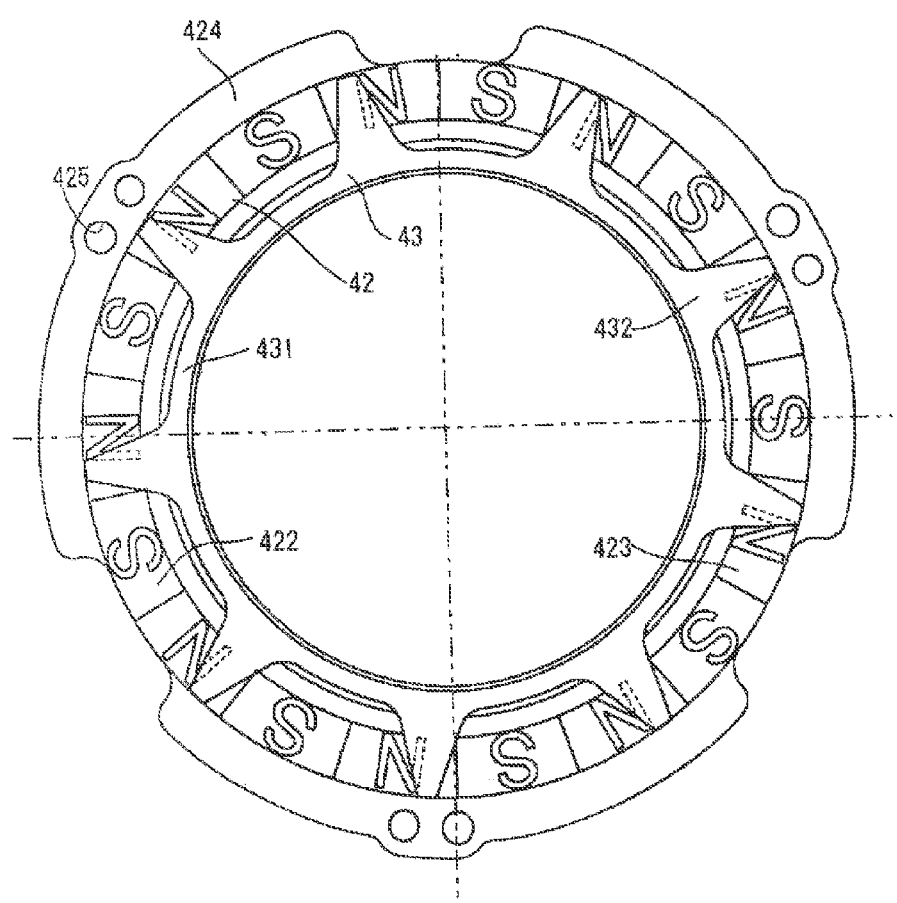
FIG. 21 is a schematic diagram showing a positional relationship of the annular magnet and the annular plate 43 in a state where the annular plate is rotated relative to the annular magnet by about 5° in a clockwise direction.

FIG. 20 is a schematic diagram showing a positional relationship of the annular magnet 42 and the annular plate 43 in a state where the annular plate 43 is not rotated relative to the annular magnet 42 (state where the handrim 31 is not operated). As shown in FIG. 20, axial outer sides (back sides with respect to the plane of FIG. 20) of the protrusions 432 are located between the N-pole 423 and the S-pole 422 in a state where the handrim 31 is not operated by the user. In this state, the magnetism of the N-pole 423 moves to the S-pole 422 through the protrusion 432. At this time, since the magnetism does not pass through the base section 431, no magnetism is detected by the detection element 44. When the handrim 31 is operated by the user, the handrim base section 39 is rotationally displaced relative to the wheel hub 383. The pins 394 (see FIG. 15) are rotationally displaced with rotational displacements of the handrim base section 39. The annular plate 43 is rotationally displaced relative to the annular magnet 42 with rotational displacements of the pins 384. In a state where an operating force for the handrim 31 increases and the boss sections 51a for the bolts 51 are in contact with the edges of the grooves 383q (see FIG. 14), the positional relationship of the annular magnet 42 and the annular plate 43 changes to a state shown in FIG. 21. FIG. 21 shows a state where the annular plate 43 is rotated relative to the annular magnet 42 by about 5° in a clockwise direction in FIG. 21. At this time, the protrusions 432 are located at positions closer to the N-poles 423 than the S-poles 422. Thus, a part of the magnetism of the N-pole 423 passes through the base section 431 and is detected by the detection element 44.

In the wheelchair 1, detection results of the two detection elements 44 are added in the controller. The controller determines an output of the motor 381 based on a calculation result obtained by adding the two detection results.

(Operation)

Figure 22:
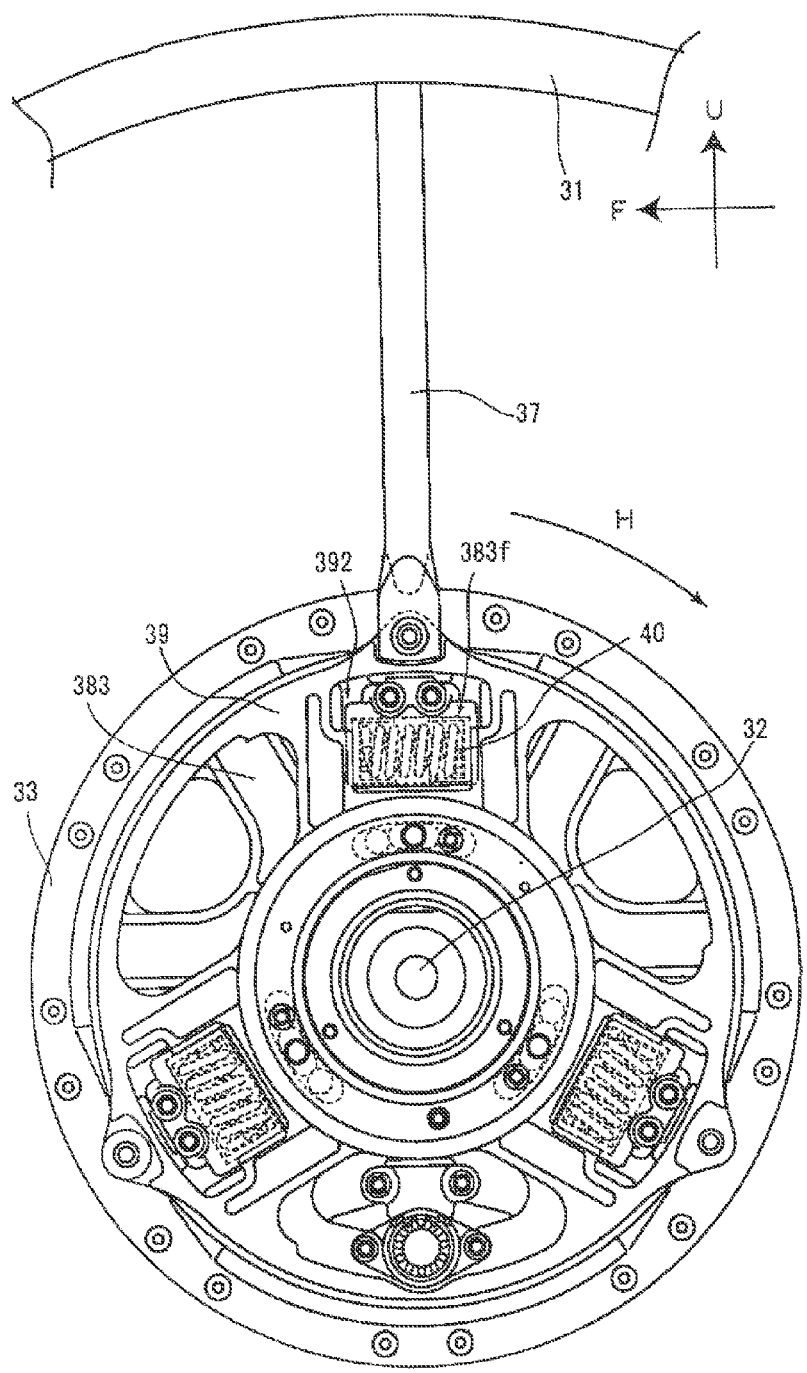
FIG. 22 shows the hub, from which the wheel cover and the cover are removed.
Figure 23:
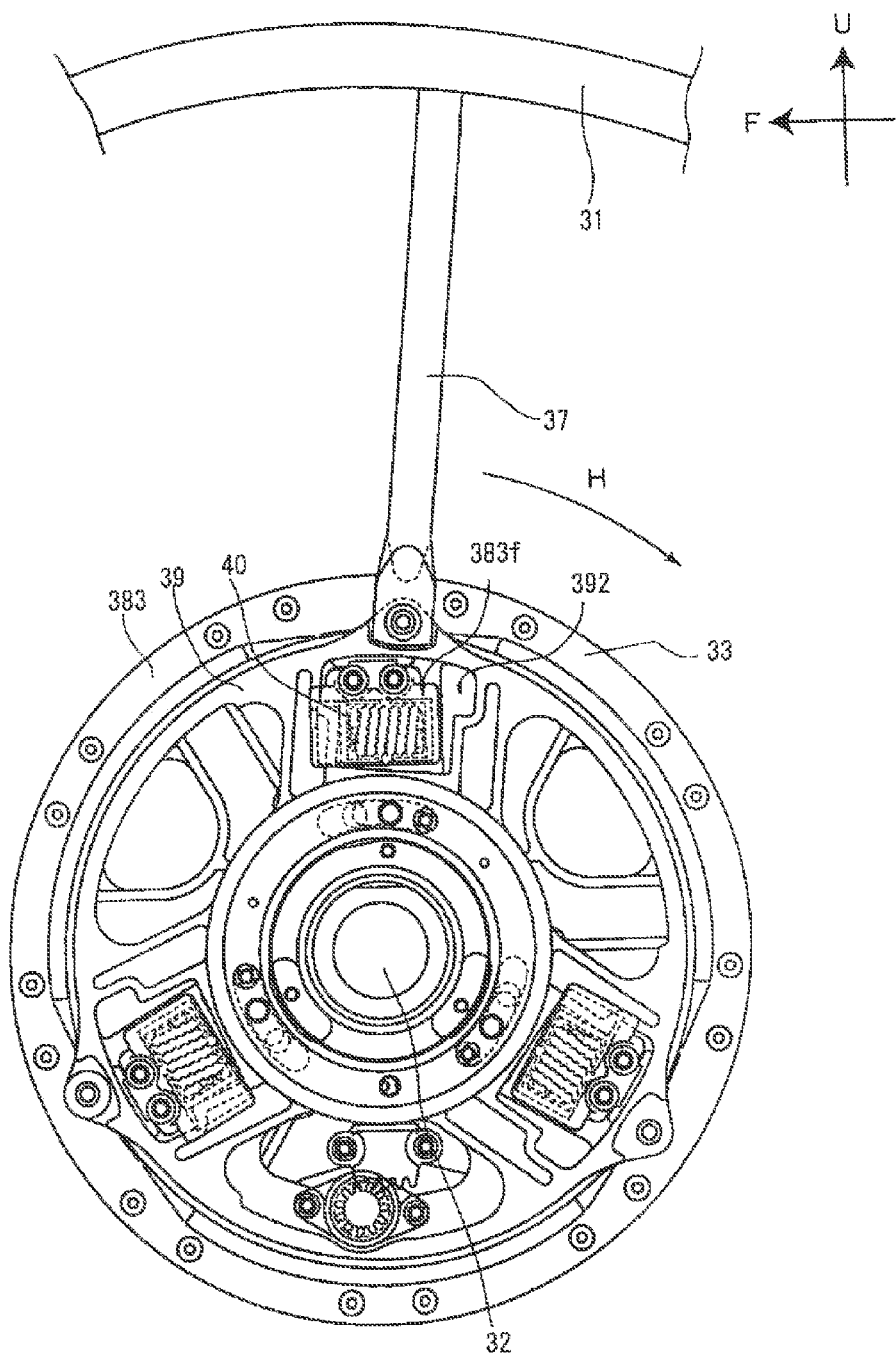
FIG. 23 shows the hub 33, from which the wheel cover and the cover are removed.

FIG. 22 shows the hub 33, from which the wheel cover 393 and the cover 83c are removed, in a state where no external force is applied to the handrim 31. In FIG. 22, the spokes 34, the tire 36 and the like are not shown. If the user rotates the handrim 31 backward (clockwise direction in FIG. 22) in a state of FIG. 22, the handrim base section 39 is rotationally displaced clockwise in FIG. 22 about the axle 32 with the rotation of the handrim 31 (see FIG. 23). The handrim base section 39 is rotationally displaced in a direction of an arrow H. At this time, as shown in FIG. 23, coil springs 40 are compressed by the support ends 392a of the spring support sections 392 and the end surfaces 383h of the spring holding surfaces 383f. Specifically, the state of FIG. 12 changes to the state of FIG. 14. In this state, an angular displacement (rotational displacement) corresponding to the operating force for the handrim 31 is produced. Here, the handrim base section 39 is rotatable relative to the wheel hub 383 until the pins 394 fixed to the handrim base section 39 come into contact with the edges of the arcuate through holes 383m provided in the wheel hub 383. In a state where the coil springs 40 are compressed, a part of the user's force operating the handrim 31 is transmitted from the handrim 31 to the wheel hub 383 via the connecting pipes 37, the handrim base section 39 and the coil springs 40.

Next, an operation of detecting rotational displacements of the handrim base section 39 relative to the wheel hub 383 is described. When the handrim 31 is pushed in a rotating direction by the user, the handrim base section 39 rotates relative to the wheel hub 383 until the boss sections 51a for the bolts 51 come into contact with the edges of the grooves 383q. The handrim base section 39 rotates relative to the wheel hub 383 by an angle corresponding to an operating force. At this time, the annular plate 43 (see FIGS. 15 and 17) rotates about the axle 32 to be rotationally displaced relative to the annular magnet 42. When the annular plate 43 rotates relative to the annular magnet 42, the protrusions 432 move in the circumferential direction at an axial inner side of the annular magnet 42. As the protrusions 432 move, the magnetisms detected by the detection elements 44 change. The rotational displacements of the handrim base section 39 relative to the wheel hub 383 are detected based on changes in the magnetisms detected by the detection elements 44. At this time, the detection elements 44 detect changes in the magnetisms due to the rotational displacements of the annular magnet 42 and the annular plate 43. The magnetisms detected by the detection elements 44 are output to the controller after being converted into electrical signals.

The detection results of the detection elements 44 are output to the controller. In the controller, an output of the motor 381 is determined based on the amount of rotation of the handrim base section 39 relative to the wheel hub 383. When the output of the motor 381 is determined, power from the battery 4 is supplied to coils of the stator 381b. When the power is supplied to the coils of the stator 381b, the rotor 381a rotates relative to the stator 381b. When the rotor 381a rotates, the motor shaft 381c rotates. By the rotation of the motor shaft 381c, the first gear 382a rotates. When the first gear 382a rotates, the power is transmitted to the wheel hub 383 via the second gear 382b, the third gear 382c, the fourth gear 382h and the transmission gear 383g. In this way, the wheelchair is moved by a total force of the power from the motor 381 and the user's force to operate the handrim 31.

When the user takes his hand off the handrim 31, the coil springs 40 rotate the handrim base section 39 in the direction opposite to the arrow H and the hub 33 returns to the state of FIG. 22. In this state, the rotation of the wheel 3 due to the power from the motor 381 and power based on the operation of the handrim 31 by the user continues. At this time, the annular magnet 42 and the annular plate 43 are in a state of FIG. 20. However, the respective members such as the handrim base section 39 and the wheel hub 383 have mounting tolerances. Thus, even if the handrim base section 39 and the wheel hub 383 integrally rotate, the annular plate 43 is slightly displaced relative to the annular magnet 42. Therefore, the detection elements 44 detect magnetism. The magnetisms detected in the detection elements 44 are called magnetic noises.

Alternatively, there are cases where dimensions of the respective protrusions 432 of the annular plate 43 vary. In such a case, a positional relationship of the handrim base section 39 facing the positions of the detection elements 44 and the integrally rotating pins 394 (core member) changes due to the rotation of the wheel 3. Thus, the magnitude of the output subtly changes when the short protrusions 432 meet the detection elements 44 in the radial direction of the annular plate 43 and when the long protrusions 432 meet the detection elements 44 in the radial direction of the annular plate 43. This change amount may become a magnetic noise.

Figure 24A:
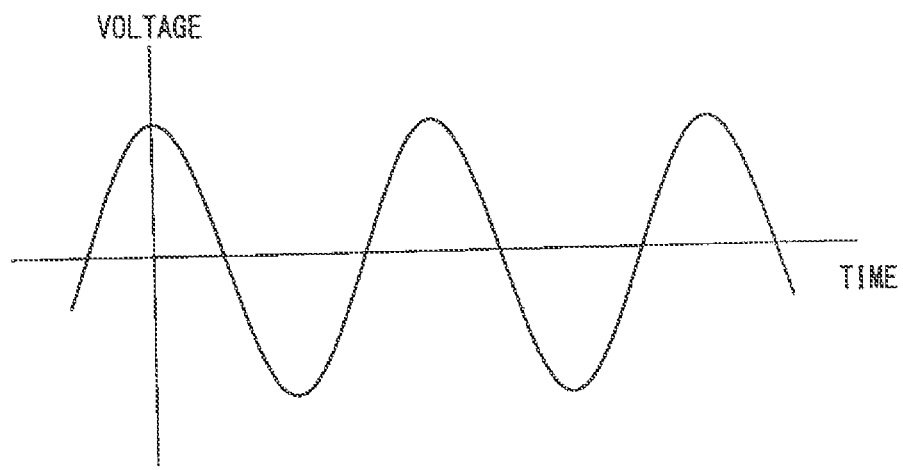
FIG. 24A shows the voltage of the electrical signal based on the detection result of one detection element.
Figure 24B:
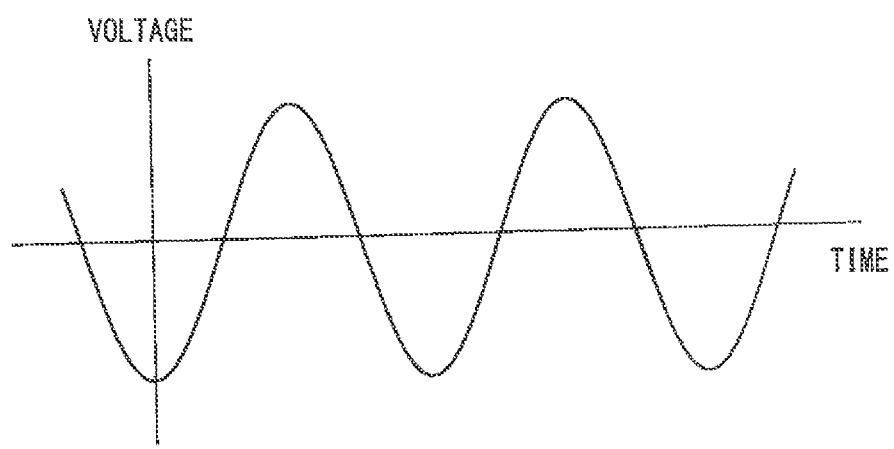
FIG. 24B shows the voltage of the electrical signal based on the detection result of the other detection element.

For example, both the annular magnet 42 and the annular plate 43 rotate in the positional relationship of FIG. 20 in a state where the handrim base section 39 and the wheel hub 383 integrally rotate relative to the power unit 38. In this state, a magnetic noise is detected in each detection element 44a, 44b. FIG. 24 show an example of voltages in converting the detection results of the detection elements 44 into electrical signals when the magnetic noises are detected. A vertical axis represents voltage. A horizontal axis represents time. FIG. 24A shows the voltage of the electrical signal based on the detection result of one detection element 44a. FIG. 24B shows the voltage of the electrical signal based on the detection result of the other detection element 44b. As shown in FIGS. 24A and 24B, the phase of the electrical signal based on the detection result of the one detection element 44 is inverted from that of the electrical signal based on the detection result of the other detection element 44. Thus, waveforms are completely canceled out if the both electrical signals are added. Therefore, a reduction in detection accuracy can be prevented even if the magnetic noises are detected by the detection elements 44. In this way, the one detection element 44a functions as a "first element" of an aspect consistent with the claimed invention and the other detection element 44b functions as a "second element" of an aspect consistent with the claimed invention.

Note that although magnetic noises may be detected due to the vibration of the wheelchair or the like also in a state where the handrim 31 is operated, the magnetic noises can be canceled out by adding the results of the detection elements 44 as described above. FIGS. 24A and 24B show an example and the same detection results as in FIGS. 24A and 24B are not always obtained.

Characteristics of the Embodiment

Since the motor 381 mounted on the wheel 3 of the wheelchair 1 described in the above embodiment is an axial gap motor and a thin motor, it can be mounted on frames of various shapes.

In the wheel 3 mounted in the wheelchair 1 described in the above embodiment, the motor 381 is arranged outwardly of a wheel mounting surface of the body frame 2 and the electrical rotational displacement detection mechanism 41 includes the annular plate 43 and the annular magnet 42 centered on the axle 32. Since the rotational displacement detection mechanism 41 is a detection mechanism using magnetism and including the pair of detection elements 44 arranged at the positions overlapping the annular magnet 42 and the annular plate 43 in the radial and circumferential directions, the axial width of the power unit 38 can be made smaller as compared with the case where a mechanism for detecting rotational displacements of the handrim base section 39 relative to the wheel hub 383 for the power unit 38 has another configuration including, for example, a rotary transformer and a potentiometer. Thus, the width of the wheelchair 1 can be made smaller.

The rotational displacement detection mechanism 41 in the wheelchair 1 described in the above embodiment detect relative rotational displacements of the handrim base section 39 and the wheel hub 383 without the members mounted in the power unit 38 and the members mounted on the wheel hub 383 touching each other. Thus, the members included in the rotational displacement detection mechanism 41 are not abraded. Therefore, it is possible to prevent a reduction in the accuracy of detecting the relative rotational displacements of the wheel hub 383 and the handrim base section 39 for the power unit 38.

Since the motor shaft of the geared motor and sensor units of the rotational displacement detection mechanism 41 are coaxially structured, a space in which the detection elements 44 of the rotational displacement detection mechanism 41 can be arranged around the axle 32 can be formed in the circumferential direction. Thus, the axial width can be made smaller as compared with a configuration in which detection elements are arranged side by side with the speed reduction mechanism 382 in the axial direction.

In the wheelchair 1 of the above embodiment, the rotation of the handrim base section 39 relative to the wheel hub 383 is detected using the two detection elements 44 for the power unit 38. In the two detection elements 44, the phases of electrical signals based on the detection results of the respective detection elements 44 are inverted from each other. Thus, even if magnetic noises are detected in the detection elements 44, they can be canceled out when the detection results of the respective detection elements 44 are added. Since the two detection elements 44 are used in the above wheelchair 1, variations of electrical signals and the like are not canceled if one detection element 44 is disconnected. Thus, in the wheelchair 1, the disconnection of one detection element 44 can be easily detected. In the above wheelchair 1, the one detection element 44a and the other detection element 44b are arranged at opposite sides of the first direction if the extending direction of the speed reduction mechanism 382 is the first direction (chain double-dashed line D) as shown in FIG. 9. Thus, if the hub 33 is deflected in the vertical direction, influences on the detection results of the mutual detection elements 44 are canceled out each other. Therefore, in the wheelchair 1, electrical signals can be accurately detected even if the hub 33 is deflected in the vertical direction.

Other Embodiments (1) Although the axial gap type motor is used as the motor in the wheelchair 1 of the above embodiment, the invention is not limited to this. For example, a radial gap type motor may be used as the motor.

(2) In the wheelchair 1 of the above embodiment, the rotational displacement detection mechanism 41 for detecting relative rotational displacements of the wheel hub 383 and the handrim base section 39 is set forth as an example and there is no limitation to this. The rotational displacement detection mechanism 41 only has to be configured to be annularly arrangeable.

Figure 25:
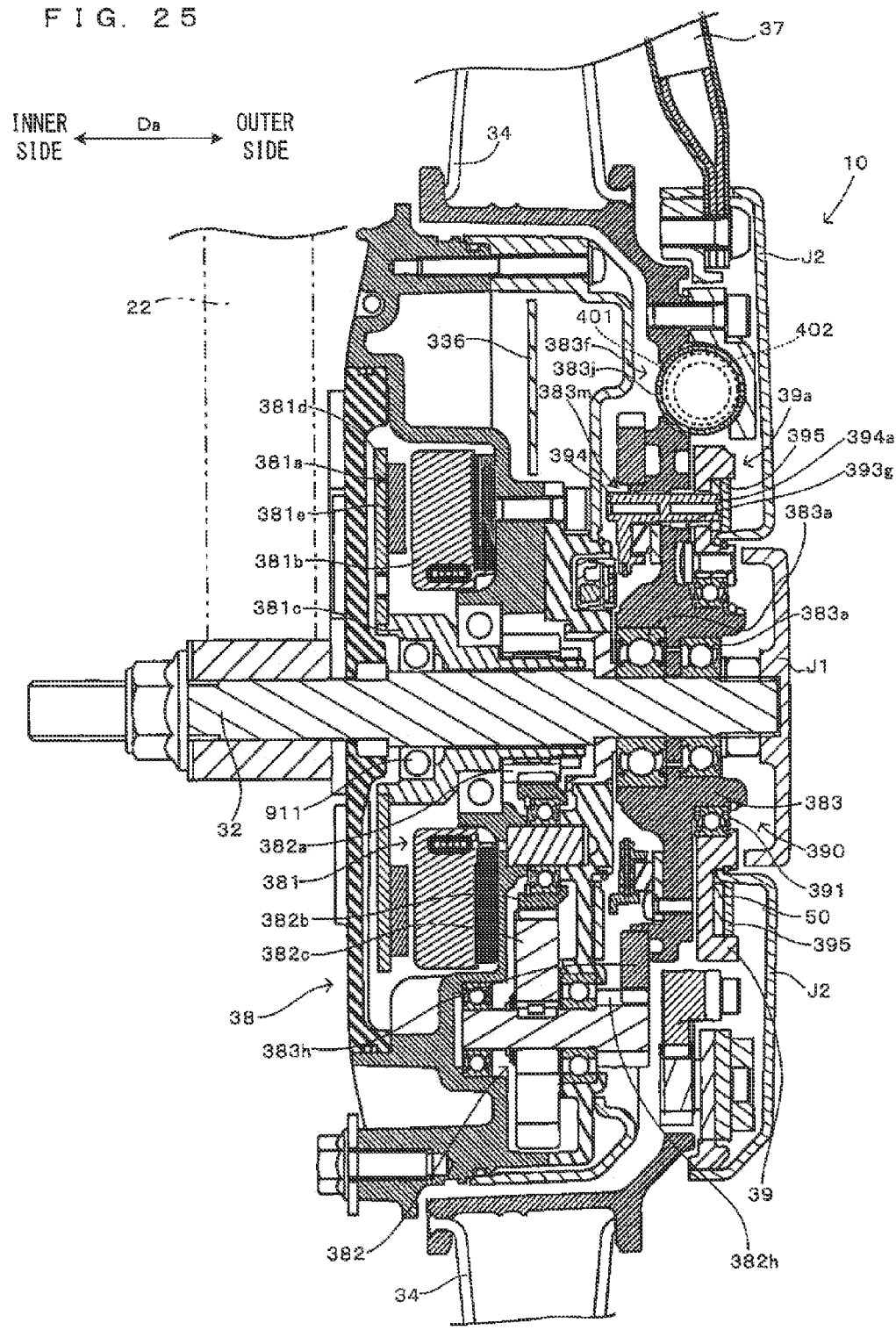
FIG. 25 is a front sectional view enlargedly showing the surrounding configuration of a power assisting mechanism provided in a wheel according to a modification of the embodiment.
Figure 26:
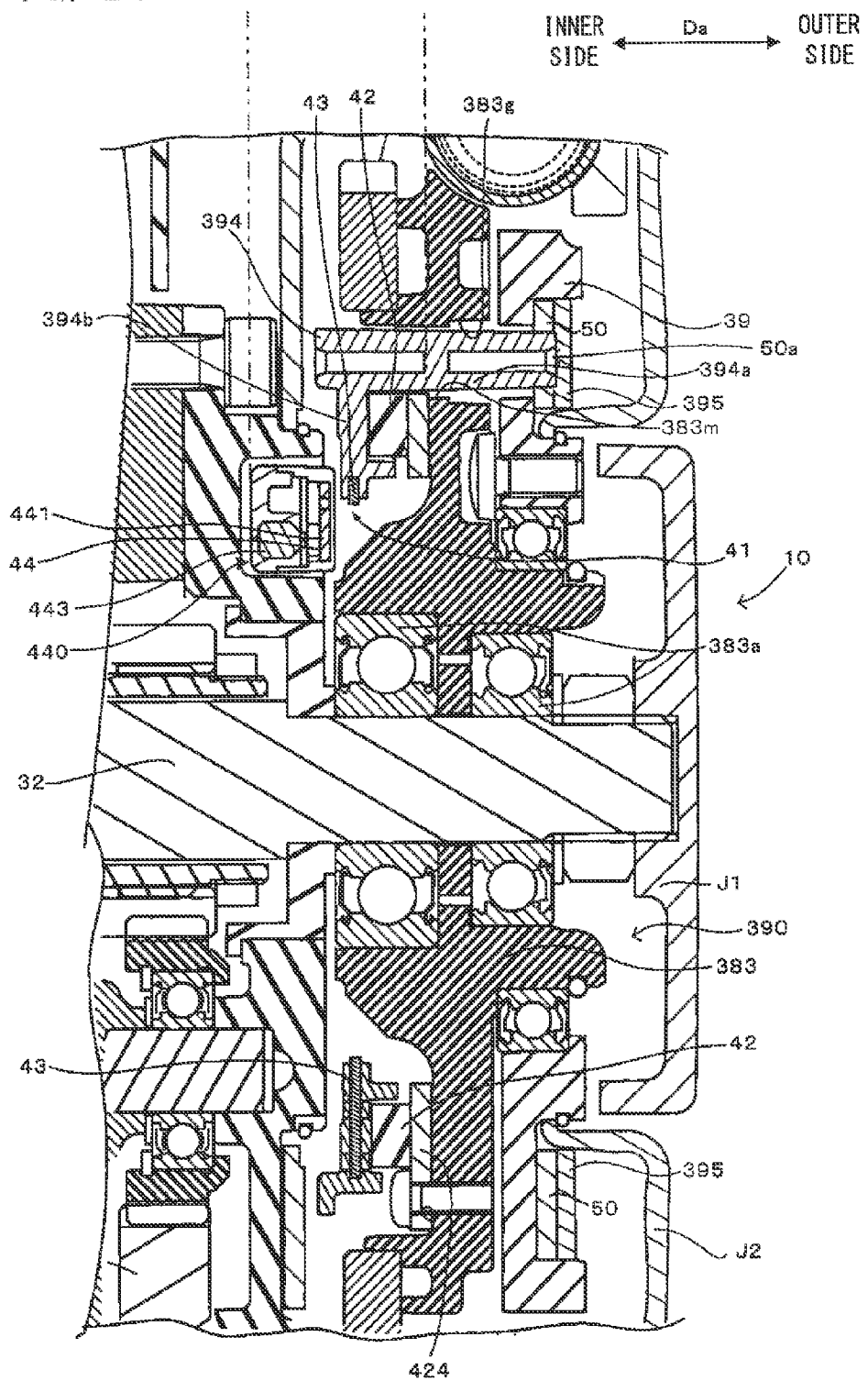
FIG. 26 is a front sectional view enlargedly showing the surrounding of a rotational displacement detection mechanism provided in the power assisting mechanism.

(3) Further, the invention is not limited to the above embodiment and various modifications can be made to the above one without departing from the gist of the claimed invention. Accordingly, the wheel 3 (power-assisted wheel) may be configured to include, for example, a power assisting mechanism 10 as shown below. FIG. 25 is a front sectional view enlargedly showing the surrounding configuration of a power assisting mechanism provided in a wheel according to a modification of the embodiment, and FIG. 26 is a front sectional view enlargedly showing the surrounding of a rotational displacement detection mechanism provided in the power assisting mechanism. An axial direction Da is attached in the lateral direction in which the axle 32 extends in these figures and following figures. The modification of the embodiment differs from the embodiment mainly in having a configuration for pressing a core member 394 by a press ring 395. In the following description, parts different from the embodiment are described after parts common to the above embodiment are described.

As described in detail in the above embodiment, axles 32 are mounted on both left and right sides of the body frames 2 and a wheel 3 and a handrim 31 are respectively rotatably mounted on each axle 32. Specifically, a circular wheel hub 383 arranged at an inner peripheral side of the wheel 3 in the form of a circular ring centered on the axle 32 is rotatably mounted on each axle 32, a plurality of spokes 34 extending from a peripheral edge part of the wheel hub 383 toward an outer peripheral side are connected to a tire 36 of the wheel 3. This makes the wheel 3 rotatable about the axle 32 together with the wheel hub 383. Further, handrim base section 39 arranged at an inner peripheral side of the handrim 31 in the form of a circular ring centered on the axle 32 and outside the wheel hub 383 is rotatably mounted on each axle 32, and three connecting pipes 37 radially extending from peripheral edge parts of the handrim base section 39 toward an outer peripheral side are connected to the handrim 31. This makes the handrim 31 rotatable about the axle 32 integrally with the handrim base section 39. Note that the handrim base section 39 is rotatably provided independently of the wheel hub 383 and the handrim 31 is rotatable about the axle 32 separately from the wheel 3.

Each handrim 31 is in contact with the adjacent wheel 3 via an elastic member (spring to be described later), and a torque applied to the handrim 31 by a user is transmitted to the wheel 3 via the elastic member to rotate the wheel 3. At this time, the handrim 31 is displaced relative to the wheel 3 by an amount corresponding to the amount of deformation of the elastic member upon receiving the torque from the user. The power assisting mechanism 10 provided in the wheelchair 1 detects the torque applied to the handrim 31 based on a measurement result of a displacement amount of the handrim 31 relative to the wheel 3 and supplies auxiliary power corresponding to the detected torque to the wheel 3. The detail of this power assisting mechanism 10 is as follows.

That is, the power assisting mechanism 10 includes a power unit 38, which supplies auxiliary power to the wheel 3, at an inner side of the wheel hub 383 in the axial direction Da. The power unit 38 rotates the wheel 3 by applying a drive force generated by a motor 381 to the wheel hub 383 via a speed reduction mechanism 382 (power transmission system) configured by an alignment of a plurality of gears described in detail using FIG. 6.

The motor 381 includes a motor shaft 381c rotatably mounted on the axle 32 via a bearing 911, a rotor 381a mounted on the motor shaft 381c and a stator 381b facing the rotor 381a from an outer side in the axial direction Da. The rotor 381a is composed of a back yoke 381d in the form of a circular ring mounted on the motor shaft 381c and centered on the axle 32 and a magnet 381e in the form of a circular ring mounted at an outer side of the back yoke 381d in the axial direction Da and centered on the axle 32. The magnet 381e of the rotor 381a faces the stator 381b. As described above using FIGS. 7 and 8, the stator 381b is so configured that a plurality of coils are arranged in a circular ring centered on the axle 32, and fixed to the axle 32. Thus, by applying a current to each coil of the stator 381b, the rotor 381a rotates about the axle 32 together with the motor shaft 381c. Then, a torque of the motor shaft 381c is transmitted to the wheel hub 383 via a gear 382a and the like of the speed reduction mechanism 382. In this way, the wheel 3 rotates together with the wheel hub 383 upon receiving power (auxiliary power) generated by the motor 381.

The wheel hub 383 is mounted on the axle 32 via a ball bearing 383a. A peripheral edge part of the wheel hub 383 is bent toward an inner side in the axial direction Da and the spokes 34 are attached thereto, whereas a central part of the wheel hub 383 is formed to be thick in the axial direction Da. The outer side surface of the central part of the wheel hub 383 projects outwardly in the axial direction Da to form a rim base mounting section 390. The handrim base section 39 is mounted on the rim base mounting section 390 of the wheel hub 383 via bearings 391. In this way, the handrim base section 39 is mounted on the axle 32 via the rim base mounting section 390 of the wheel hub 383 and rotatable about the axle 32 independently of the wheel hub 383. Further, the outer side surfaces of the wheel hub 383 and the handrim base section 39 are covered by a circular cover J1 and an annular cover J2 surrounding the circular cover J1.

A torque can be transmitted from the handrim base section 39 to the wheel hub 383 via springs 401, 402 (coil springs) of the power assisting mechanism 10. That is, in the wheel hub 383, a cylindrical spring cover 383j is mounted on a spring holding surface 383f provided between the peripheral edge part to which the spokes 34 are attached and the central part where the rim base mounting section 390 is provided, and the springs 401, 402 (compression springs) are arranged substantially in a circumferential direction of the wheel hub 383 in the spring cover 383j. A diameter of the spring 401 is larger than that of the spring 402, and the spring 402 is inserted in the spring 401. Further, at least one of the springs 401, 402 is accommodated in the spring cover 383j in a pre-compressed state (pressurized state).

The power assisting mechanism 10 is described in detail again using FIGS. 13, 14 and 22. Note that although three springs covers 383j are provided at equal pitches in the circumferential direction as shown in FIG. 22, description here is centered on a configuration for one spring cover 383j since configurations for the respective spring covers 383j are all identical.

A pair of sliders 403 are accommodated in a state facing each other in extending and contracting directions of the springs 401, 402 (substantially circumferential direction of the wheel hub 383) in the spring cover 383j mounted on the wheel hub 383. Each slider 403 has a hollow cylindrical shape with one open surface and the other closed surface, and openings of the respective sliders 403 are facing each other. The springs 401, 402 are inserted between these sliders 403, and the respective sliders 403 are movable in the extending and contracting directions of the springs 401, 402 while being biased in directions away from each other by the springs 401, 402. As a result, in the state shown in FIG. 22 corresponding to a case where no torque is applied, the respective sliders 403 are held in contact with the respective ends of the spring cover 383j by being pushed outwardly by biasing forces of the springs 401, 402.

On the other hand, the handrim base section 39 includes a pair of spring support sections 392 arranged to sandwich the pair of sliders 403 in the extending and contracting directions of the springs 401, 402. As shown in FIG. 13, the wheel hub 383 and the spring cover 383j are deviated toward opposite ends from central parts of the sliders 403 when viewed in the extending and contracting directions of the springs 401, 402, and the central parts of the sliders 403 are exposed to the adjacent handrim base section 39 (spring support sections 392). Further, as shown in FIG. 22, a distance between the both spring support sections 392 is equal to a distance between the respective ends of the spring cover 383j. As a result, the respective spring support sections 392 are in contact with the central parts of the respective sliders 403 held in contact with the respective ends of the spring cover 383j in the state shown in FIG. 22. In such a configuration, if a torque acting in a forward direction Df or a backward direction Db (directions Df, Db are opposite to each other) is applied to the handrim 31, the handrim base section 39 is displaced in the torque applying direction relative to the wheel hub 383 against elastic forces of the springs 401, 402.

That is, if a torque acting in the backward direction Db (substantially rightward direction of FIG. 14) is applied to the handrim 31 as shown in FIG. 14, the spring support section 392 on the forward direction Df (a substantially leftward direction of FIG. 14) side out of the pair of spring support sections 392 in the handrim base section 39 applies a torque acting in the backward direction Db to the slider 403 adjacent thereto. When the torque applied from the spring support section 392 on the forward direction Df side to the slider 403 exceeds the pressure of the springs 401, 402, the spring support section 392 on the forward direction Df side pushes the slider 403 in the backward direction Db against the elastic forces of the springs 401, 402, with the result that the handrim 31 rotates in the backward direction Db relative to the wheel 3. The handrim 31 is displaced relative to the wheel 3 until a total force of forces acting on the sliders 403 by the torque applied to the handrim 31 and the elastic forces of the springs 401, 402 becomes zero. At this time, a displacement amount of the handrim 31 in the backward direction Db relative to the wheel 3 corresponds to (is proportional to) the magnitude of the torque applied to the handrim 31 by the user.

Note that although the case where the torque acting in the backward direction Db is applied to the handrim 31 is described here, a similar operation is performed except that a displacement direction of the handrim 31 relative to the wheel 3 is opposite also for a case where a torque acting in the forward direction Df is applied to the handrim 31. That is, the handrim 31 is displaced in the forward direction Df relative to the wheel 3 by a displacement amount corresponding to (proportional to) the magnitude of a torque applied to the handrim 31 by the user.

Further, a configuration for limiting a displacement of the handrim 31 relative to the wheel 3 is provided as particularly shown in FIGS. 5, 25 and 14. Specifically, an annular plate 50 is fitted into an annular groove 39a formed in the handrim base section 39, and this annular plate 50 is screwed to the handrim base section 39 by one bolt 51 (note that the boss section 51b shown in broken line in FIG. 14 does not function as a bolt for fastening the annular plate 50). Thus, these bolts 51 are displaced in the rotating direction Df, Db relative to the wheel 3 together with the handrim 31. On the other hand, annular grooves 383q are formed in the wheel hub 383 and boss sections 51a for the respective bolts 51 screwed to the handrim base section 39 move inside these grooves 383q. Thus, the range of a displacement of the handrim 31 in the forward direction Df relative to the wheel 3 is limited to a position where the boss sections 51a for the bolts 51 moving in the forward direction Df come into contact with end parts of the grooves 383q in the forward direction Df. Similarly, the range of a displacement of the handrim 31 in the backward direction Db relative to the wheel 3 is limited to a position where the boss sections 51a for the bolts 51 moving in the backward direction Db come into contact with end parts of the grooves 383q in the backward direction Db.

The wheel hub 383 is formed with an arcuate through hole 383m provide inside the groove 383q. A claw section 394a of a core member 394 is fitted into the through hole 383m. Functions of these through hole 383m and claw section 394a of the core member 394 are described in detail later.

As described above, the handrim 31 is displaced relative to the wheel 3 by an amount corresponding to a torque applied by the user. Accordingly, the power assisting mechanism 10 measures a displacement amount of the handrim 31 relative to the wheel 3 and detects a torque applied to the handrim 31 based on the measurement result. Also in this embodiment, the displacement amount is measured using magnetic sensors as in the above embodiment.

This point is described in detail using FIG. 20 again in addition to FIG. 26. In a rotational displacement detection mechanism 41, an annular magnet 42 in the form of a circular ring centered on the axle 32 is mounted at an inner side of the wheel hub 383 via a fixed plate 424. The annular magnet 42 is so configured that S-poles 422 and N-poles 423 are alternately arranged at predetermined arrangement pitches in a circular ring (18 magnetic poles 422, 423 are arranged at an arrangement pitch of 20° in the example of FIG. 20). The annular magnet 42 rotates about the axle 32 together with the wheel hub 383.

Further, an annular plate 43 in the form of a circular ring centered on the axle 32 is provided in the rotational displacement detection mechanism 41. The annular plate 43 (magnetized section) is a magnetic material (e.g. iron as a ferromagnetic material) and adjacent to the annular magnet 42 from an inner side in the axial direction Da. The annular plate 43 is so configured that a plurality of protrusions 432 projecting radially outward and facing the annular magnet 42 in the axial direction Da are arranged in a circular ring at predetermined arrangement pitches (in the example of FIG. 8, nine protrusions 432 are arranged at an arrangement pitch of 40°). At this time, the arrangement pitch (=40°) of the protrusions 432 in the annular plate 43 is set to be an even multiple (two-fold in FIG. 20) of the arrangement pitch (=20°) of the respective magnetic poles 422, 423, and a positional relationship of the protrusion 432 with the magnetic poles 422, 423 is set to be the same for each protrusion 432. As a result, each protrusion 432 is similarly affected by a magnetic field generated by the annular magnet 42 and magnetized substantially to the same degree. Note that the annular plate 43 is separated from the annular magnet 42 at each base section 431 between the respective protrusions 432 adjacent in the circumferential direction.

As shown in FIG. 26, the rotational displacement detection mechanism 41 includes the core member 394 (corresponding to the pins 394 in the above embodiment) having a schematic configuration for holding the annular plate 43 at the base sections 431 between the protrusions 432 by a main body 394a, 394b. The core member 394 is formed by casting the annular plate 43 into the main body 394a, 394b made of a nonmagnetic material (e.g. resin), and includes the claw sections 394a extending in the axial direction Da and a holding section 394b extending from inner end parts of the claw sections 394a in the axial direction Da toward a radial center side of the wheel 3. The claw section 394a projects outward in the axial direction Da from the arcuate through hole 383m provided in the wheel hub 383 and is engaged with an engaging hole 50a provided in the annular plate 50. The engaging hole 50a of the annular plate 50 is formed to have a diameter equal to or slightly larger than the claw section 394a of the core member 394. Since the annular plate 50 is fixed to the handrim base section 39 of the handrim 31, the engaging holes 50a of the annular plate 50 rotate together with the core member 394 if the handrim 31 rotates, with the result that the annular plate 43 held by the main body 394a, 394b of the core member 394 also rotates. Since the through hole 383m of the wheel hub 383 into which the claw section 394a of the core member 394 is fitted is formed into an arcuate shape having a length in the circumferential direction, the core member 394 can rotate together with the annular plate 43 without being hindered by the through hole 383m. In this way, the annular plate 43 is displaced together with the handrim 31 relative to the wheel 3 by the function of the claw sections 394a of the core member 394.

The holding section 394b of the core member 394 is provided to straddle the annular magnet 42 in the radial direction of the wheel 3 at the inner side in the axial direction Da, and the annular plate 43 is cast into this holding section 394b. In this way, the annular plate 43 is held spaced apart from the annular magnet 42 with a predetermined clearance defined therebetween at the inner side of the annular magnet 42 in the axial direction Da by the function of the holding section 394b of the core member 394.

Further, the rotational displacement detection mechanism 41 includes a magnetic head 440 arranged at a side of the annular plate 43 opposite to the annular magnet 42 in the axial direction Da (i.e. at the inner side of the annular plate 43 in the axial direction Da). The magnetic head 440 is fixed to the axle 32 and does not rotate. The magnetic head 440 includes a metal plate 441 (e.g. made of iron) facing the annular plate 43, a detection element 44 facing the metal plate 441 from an inner side in the axial direction Da, and a back-up member 443 facing the detection element 44 from the inner side in the axial direction Da. As just described, the magnetic head 440 is configured to sandwich the detection element 44 between the metal plate 441 and the back-up member 443 in the axial direction Da. The metal plate 441 functions as a magnetism collecting member for collecting a magnetic field generated by the annular plate 43 magnetized by the annular magnet 42. On the other hand, the back-up member 443 is made of metal (e.g. iron) and fulfills a function of forming a magnetic field path between the back-up member 443 and the metal plate 441. The detection element 44 is formed by a magnetic sensor such as a Hall element and detects a magnetic field reaching the back-up member 443 from the metal plate 441 and outputs an electrical signal (voltage signal).

In the rotational displacement detection mechanism 41 configured as described above, an electrical signal having a magnitude corresponding to a torque applied to the handrim 31 is output from the detection element 44. That is, in the rotational displacement detection mechanism 41, if the handrim 31 is displaced relative to the wheel 3 by the application of a torque, the annular plate 43 mounted on the handrim 31 is displaced relative to the annular magnet 42 mounted on the wheel 3. As a result, a degree of magnetization of the annular plate 43 by the annular magnet 42 changes according to a displacement amount of the handrim 31 and the electrical signal output from the detection element 44 changes. This point is described in detail again using FIG. 21 in addition to FIG. 20.

As shown in FIG. 20, since the respective protrusions 432 of the annular plate 43 are located on boundaries between the N-poles 423 and the S-poles 422 in a state where no torque is applied to the handrim 31, the magnetizations of the respective protrusions 432 by the both magnetic poles 422, 423 are canceled out and the annular plate 43 is not magnetized. Thus, the detection element 44 outputs an electrical signal of a voltage equal to a reference voltage. Contrary to this, the respective protrusions 432 of the annular plate are displaced toward the N-poles 423 (in the backward direction Db) from the boundaries between the N-poles 423 and the S-poles 422 in a state where a torque acting in the backward direction Db is applied to the handrim 31, for example, as shown in FIG. 21. Thus, the annular plate 43 is magnetized to an N-pole by being strongly influenced by the N-poles 423 than by the S-poles 422. Therefore, the detection element 44 outputs an electrical signal of a voltage higher than the reference voltage. Specifically, the electrical signal has a magnitude corresponding to a displacement amount of the respective protrusions 432 from the boundaries between the N-poles 423 and the S-poles 422. Such a displacement amount corresponds to the magnitude of the torque applied to the handrim 31 for the reason described in detail above. As a result, the detection element 44 outputs an electrical signal having a magnitude corresponding to the torque applied in the backward direction Db.

Note that although the case where the torque acting in the backward direction Db is applied to the handrim 31 is described here, a similar operation is performed except that the polarity of the electrical signal from the detection element 44 is opposite (voltage smaller than the reference voltage) also for a case where a torque acting in the forward direction Df is applied to the handrim 31. That is, the detection element 44 outputs an electrical signal having a magnitude corresponding to the torque applied in the forward direction Db.

As just described, also in this modification, the rotational displacement detection mechanism 41 detects rotational displacements of the handrim base section 39 relative to the wheel hub 383 by relatively rotating the annular plate 43 (first plate) and the annular magnet 42 (magnet) about the axle 32 of the motor 381 as in the above embodiment. In this way, a center of rotation of the rotational displacement detection mechanism (i.e. center about which the annular plate 43 and the annular magnet 42 relatively rotate) coincides with the center of the axle 32 of the motor 381, and effects similar to the above embodiment can be achieved.

In the case of using the rotational displacement detection mechanism 41 as described above, the rotational displacement detection mechanism 41 continues to output an electrical signal having a constant magnitude corresponding to a displacement amount of the handrim 31 relative to the wheel 3 if there is no temporal change in the displacement of the handrim 31 relative to the wheel 3. However, the magnitude of the electrical signal output from the rotational displacement detection mechanism 41 may temporally fluctuate regardless of the absence of a temporal change in the displacement of the handrim 31 relative to the wheel 3 due to the variation of the respective lengths of a plurality of protrusions 432 of the annular plate 43 caused by a manufacturing error or the like.

That is, when the wheelchair 1 is traveling in a state where there is no temporal change in the displacement of the handrim 31 relative to the wheel 3, the wheel 3 and the handrim 31 rotate about the axle 32 while maintaining a constant displacement amount. As a result, the annular magnet 42 at the side of the wheel 3 and the annular plate 43 of the handrim 31 pass before the magnetic head 440 while maintaining a constant phase difference. At this time, the annular plate 43 is magnetized by a constant amount corresponding to this phase difference since the phase difference between the annular magnet 42 and the annular plate 43 is constant. However, if the lengths of the plurality of protrusions 432 arranged in the circumferential direction in the annular plate 43 vary, a degree of magnetization of the annular plate fluctuates depending on the position in the circumferential direction and an electrical signal output from the magnetic head 440 fluctuates in accordance with this (magnetic noise).

Accordingly, a plurality of (preferably two) rotational displacement detection mechanisms 41 are provided for each wheel 3, for example, as described using FIG. 19. As described above, a virtual straight line D extending in the vertical direction while passing through the center of the axle 32 and a virtual straight line G extending in the horizontal direction while passing through the center of the axle 32 are written in FIG. 19. Further, angles E, F from the detection elements 44 (elements) of the rotational displacement detection mechanism 41 to the virtual straight line D with an intersection of the virtual straight lines D, G as a center are written. The angles E, F are both set at 70°, and an angle (=E+F) between the both detection elements 44 (first element, second element) is set at 140°. Since an arrangement pitch Pp of the protrusions 432 in the annular plate 43 is 40° in the configuration where the rotational displacement detection mechanism 41 is arranged in this way, the base section 431 between adjacent protrusions 432 radially faces the other detection element 44 at a timing at which the protrusion 432 radially faces one detection element 44. Thus, if T432 denotes a cycle that the protrusions 432 successively pass the position radially facing the detection element 44, a detection timing of a magnetic field by the radially facing protrusion 432 is shifted by half the cycle (=T432/2) between the two detection elements 44. As a result, the phases of magnetic noises are substantially inverted between the two detection elements 44. Thus, a control board 336 can generate a detection signal Sp having the influence of the magnetic noises suppressed by adding the electrical signals of the both detection elements 44. Then, the control board 336 applies a drive signal Sd corresponding to the detection signal Sp to the motor 381 to supply auxiliary power to the wheel 3.

As just described, in the wheelchair 1, the handrim 31 is displaced relative to the wheel 3 if a torque T is applied to the handrim 31. Then, the control board 336 generates a detection signal Sp having a magnitude corresponding to a displacement amount X of the handrim 31 relative to the wheel 3 and generates a drive signal Sd corresponding to the magnitude of the detection signal Sp. That is, the displacement amount X, the detection signal Sp and the drive signal Sd are successively generated based on the torque T applied to the handrim 31. Next, signal generation performed in this way is described in detail.

Figure 27:
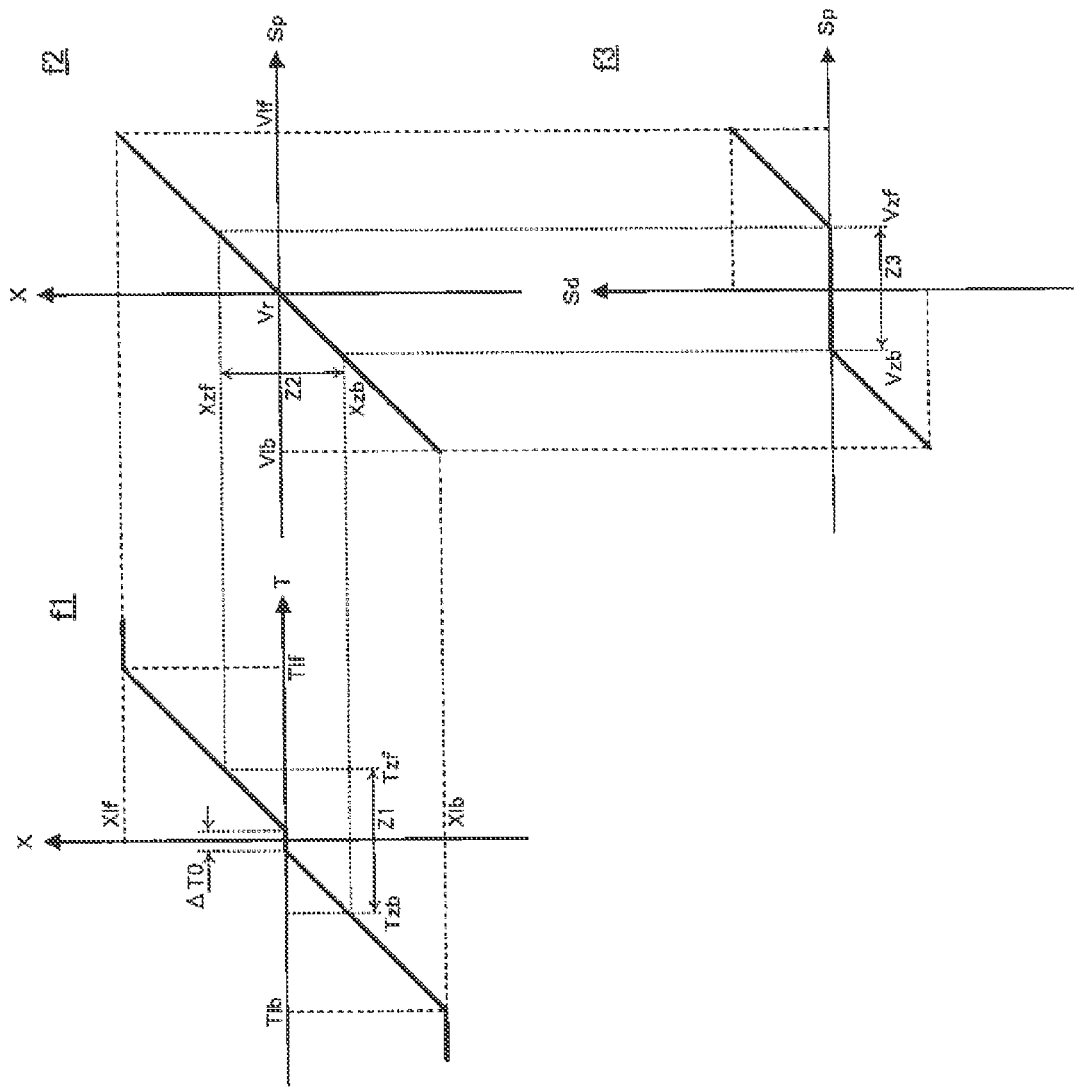
FIG. 27 is graphs diagrammatically showing states of generating the respective signals from a torque applied to the handrim.

FIG. 27 is graphs diagrammatically showing states of generating the respective signals from a torque applied to the handrim. In FIG. 27, a function f1 illustrates a relationship of the torque T applied to the handrim 31 and the displacement amount X of the handrim 31, a function f2 illustrates a relationship of the displacement amount X of the handrim 31 and the detection signal Sp and a function f3 illustrates a relationship of the detection signal Sp and the drive signal Sd.

As shown by the function f1, the displacement amount X of the handrim 31 relative to the wheel 3 increases with an increase in the torque T applied to the handrim 31. That is, if a torque T is applied in the forward direction Df (horizontal axis rightward direction), a displacement amount X corresponding to the magnitude of the torque T is generated in the forward direction Df (vertical axis upward direction). If a torque T is applied in the backward direction Db, a displacement amount X corresponding to the magnitude of the torque T is generated in the backward direction Db (vertical axis downward direction). However, as described above, the springs 401, 402 for transmitting a torque from the handrim 31 to the wheel 3 are pressurized. Thus, there is no displacement amount X of the handrim 31 while the torque T lies in a pressurization area ΔT0 where the torque T does not exceed the pressure of the springs 401, 402. If the torque deviates from the pressurization area ΔT0, the displacement amount of the handrim 31 increases in proportion to an increase in the torque T. Note that a displacement of the handrim 31 relative to the wheel 3 is restricted in both the forward direction Df and the backward direction Db by the boss sections 51a and the grooves 383q described above. Thus, if the torque T reaches a value T1f, the displacement amount X becomes constant at a value Xlf and does not change any further. Similarly, if the torque T reaches a value T1b, the displacement amount X becomes constant at a value Xlb and does not change any further.

As shown by the function f2, the detection signal Sp changes in proportion to the torque T applied to the handrim 31. That is, a detection signal Sp of a voltage equal to a reference voltage Vr is output while there is no displacement amount X. If there is a displacement amount X in the forward direction Df (vertical axis upward direction), a detection signal Sp of a voltage higher (horizontal axis rightward direction) than the reference voltage Vr corresponding to the forward direction Df is generated. If there is a displacement amount X in the backward direction Db (vertical axis downward direction), a detection signal Sp of a voltage lower (horizontal axis leftward direction) than the reference voltage Vr corresponding to the backward direction Db is generated.

At this time, the magnitude of the detection signal Sp given by an absolute value (=|V−Vr|) of a difference between the voltage V of the detection signal Sp and the reference voltage Vr is proportional to the magnitude of the displacement amount X. Note that, in the graph showing the function f2, the voltage of the detection signal Sp when the displacement amount X is at a maximum value Xlf in the forward direction Df is denoted by a value Vlf and the voltage of the detection signal Sp when the displacement amount X is at a maximum value Xlb in the backward direction Db is denoted by a value Vlb.

As shown by the function f3, the drive signal Sd increases according to an increase in the detection signal Sp. That is, if a detection signal Sp corresponding to the forward direction Df (horizontal axis rightward direction) is generated, a drive signal Sd (having a polarity on the upper side of the vertical axis) corresponding to the magnitude of the detection signal Sp is generated and auxiliary power acting in the forward direction Df is supplied to the wheel 3. Further, if a detection signal Sp corresponding to the backward direction Db (horizontal axis leftward direction) is generated, a drive signal Sd (having a polarity on the lower side of the vertical axis) corresponding to the magnitude of the detection signal Sp is generated and auxiliary power acting in the backward direction Db is supplied to the wheel 3. However, a dead zone Z3 is provided in the function f3 for converting the detection signal Sp into the drive signal Sd (input/output characteristic). This dead zone Z3 is provided from a voltage value Vzb to a voltage value Vzf and set to include the reference voltage Vr. Thus, while the voltage value of the detection signal Sp lies in the dead zone Z3, no drive signal Sd is generated and the motor 381 generates no auxiliary power. Contrary to this, if the voltage value of the detection signal Sp deviates from the dead zone Z3, the magnitude of the drive signal Sd increases according to an increase in the magnitude of the detection signal Sp and the motor 381 generates auxiliary power corresponding to the magnitude of the detection signal Sp.

The provision of the dead zone Z3 in the output of the drive signal Sd in response to the detection signal Sp is substantially the same as that of a dead zone Z2, Z1 in the output of the drive signal Sd in response to the displacement amount X or the output of the drive signal Sd in response to the torque T. That is, according to a conversion characteristic (hereinafter, written as f3·f2) obtained by combining the functions f2, f3, no drive signal Sd is generated and the motor 381 generates no auxiliary power while the displacement amount X lies in the dead zone Z2 from a displacement amount Xzb to a displacement amount Xzf. Contrary to this, if the displacement amount X deviates from the dead zone Z2, the magnitude of the drive signal Sd increases according to an increase in the magnitude of the displacement amount X and the motor 381 generates auxiliary power corresponding to the magnitude of the displacement amount X. Here, the displacement amount Xzb is the displacement amount X when the voltage value of the detection signal Sp is Vzb, and the displacement amount Xzf is the displacement amount X when the voltage value of the detection signal Sp is Vzf. Further, according to a conversion characteristic obtained by combining the functions f1, f2 and f3, no drive signal Sd is generated and the motor 381 generates no auxiliary power while the torque T lies in the dead zone Z1 from a torque Tzb to a torque Tzf. Contrary to this, if the torque T deviates from the dead zone Z3, the magnitude of the drive signal Sd increases according to an increase in the magnitude of the torque T and the motor 381 generates auxiliary power corresponding to the magnitude of the torque T. Here, the torque Tzb is the torque T when the voltage value of the detection signal Sp is Vzb, and the torque Tzf is the torque T when the voltage value of the detection signal Sp is Vzf. The dead zone Z1 includes the pressurization area ΔT0, as shown in FIG. 27.

In such a wheelchair 1, if the user operates the handrim 31 to apply a torque T to the handrim 31, the handrim 31 is displaced in an operating direction relative to the wheel 3 and auxiliary power for driving the wheel 3 in the operating direction is generated. Further, if the user stops applying the torque T to the handrim 31, the auxiliary power supplied to the wheel 3 disappears since the handrim 31 returns to a neutral point due to the elastic forces of the springs 401, 402.

Figure 28:
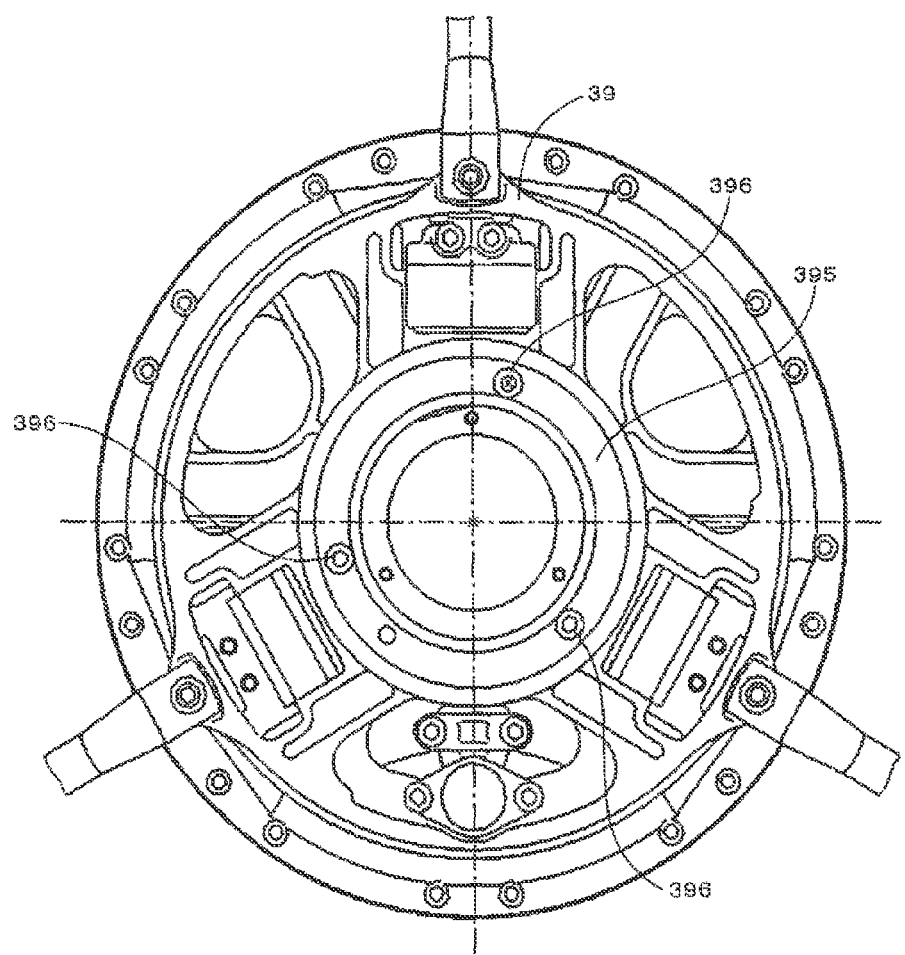
FIG. 28 is a side view showing the configuration of the surrounding of the power assisting mechanism when the circular cover and the annular cover are removed.
Figure 29:
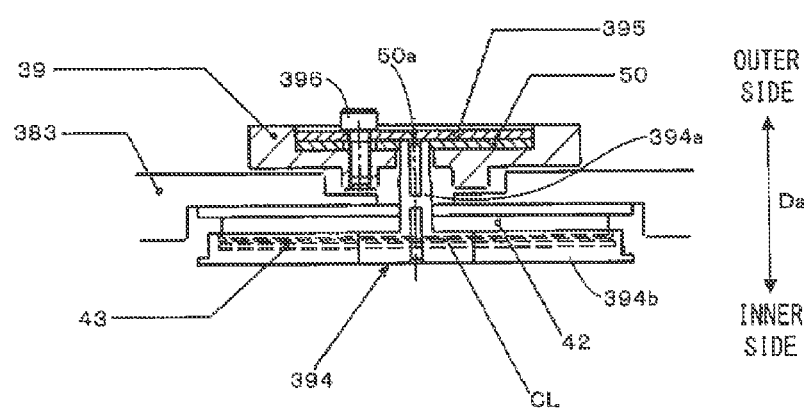
FIG. 29 is a top partial cross-sectional view partially showing a peripheral configuration of the press ring in a cross-section along the axial direction perpendicular to the planes of FIGS. 25, 26.

As described above, the modification of the embodiment has the configuration for pressing the core member 394 by the press ring 395. Next, such a configuration is described in detail using FIGS. 28 and 29 in addition to FIGS. 25, 26. Here, FIG. 28 is a side view showing the configuration of the surrounding of the power assisting mechanism when the circular cover and the annular cover are removed. FIG. 29 is a top partial cross-sectional view partially showing a peripheral configuration of the press ring in a cross-section along the axial direction perpendicular to the planes of FIGS. 25, 26. In FIG. 29, a part of the annular magnet 42 hidden behind the core member 394 is shown in broken line and the annular plate 43 (magnetized section) hidden behind the core member 394 is shown in broken line.

As shown in FIGS. 25 and 26, the power assisting mechanism 10 includes the core member 394 configured to hold the magnetized section 43 (i.e. annular plate 43) by the main body 394a, 394b. The annular magnet 42 is provided on a corner portion formed by the holding section 394b and the claw sections 394a of the core member 394. More specifically, the holding section 394b of the core member 394 is arranged to straddle the annular magnet 42 in the radial direction (direction perpendicular to the axial direction Da) of the wheel 3 while facing the annular magnet 42 from an inner side in the axial direction Da of the axle 32. The holding section 394b holds the magnetized section 43 at the inner end in the radial direction of the wheel 3. On the other hand, the claw section 394a of the core member 394 extends from the outer end of the holding section 394b in the radial direction of the wheel 3 toward the outer side in the axial direction Da across the annular magnet 42. The outer end of the claw section 394a in the axial direction Da is engaged with the engaging hole 50a of the annular plate 50. As a result, the core member 394 is seen through (the engaging hole 50a of) the annular plate 50 as in the state shown in FIG. 11 in a state where the press ring 395 is detached.

In the case of arranging the core member 394 and the annular magnet 42 in this way, the magnetized section 43 of the core member 394 and the annular magnet 42 are adjacent in the axial direction Da. Thus, an attractive force due to magnetism between the magnetized section 43 and the annular magnet 42 is generated and a force acts on the core member 394 toward the outer side in the axial direction Da. Accordingly, in the state where the press ring 395 is detached, the outer ends of the claw sections 394a of the core member 394 in the axial direction Da project outward in the axial direction Da from the engaging holes 50a of the annular plate 50. However, in this modification, the press ring 395 is arranged over the annular plate 50 from the outer side in the axial direction Da. Therefore, the outer ends of the claw sections 394a in the axial direction Da are pressed toward the inner side in the axial direction Da by the press ring 395. Hence, a clearance CL is provided in the axial direction Da between the holding section 394b of the core member 394 and the annular magnet 42.

Note that the press ring 395 is fixed to the handrim base section 39 by fixing screws 396. That is, the press ring 395 and the annular plate 50 respectively include insertion holes having a diameter smaller than the heads of the fixing screws 396, and the fixing screws 396 inserted into the insertion holes of the press ring 395 and the annular plate 50 are tightened into screw holes provided in the handrim base section 39. As shown in FIG. 28, the press ring 395 is fixed by the fixing screws 396 at three positions arranged at equal pitches in the circumferential direction. This causes the press ring 395 to firmly press the core member 394 in the axial direction Da against the attractive force (magnetic force) generated between the magnetized section 43 and the annular magnet 42, whereby the clearance CL between the holding section 394b of the core member 394 and the annular magnet 42 can be reliably ensured.

As described above, in this modification, the core member 394 for holding the magnetized section 43 by the holding section 394b and the annular magnet 42 are relatively displaceable in the rotating direction about the axle 32, and the magnetism generated by the magnetized section 43 magnetized with an intensity corresponding to the mutual displacement amount X is detected by the detection element 44. Further, the annular magnet 42 is mounted on the wheel hub 383 and the core member 394 is mounted on the handrim base section 39. Thus, the core member 394 and the annular magnet 42 are also relatively displaced with the relative displacements of the wheel hub 383 and the handrim base section 39. Therefore, the displacement amount X between the wheel hub 383 and the handrim base section 39 can be detected by the detection element 44.

Note that, as described above, the attractive force due to magnetism is generated between the magnetized section 43 of the core member 394 and the annular magnet 42. At this time, if the holding section 394b of the core member 394 facing the annular magnet 42 and the annular magnet 42 are pressed toward each other by this attractive force, a frictional force generated between the core member 394 and the annular magnet 42 may become larger and there may be an influence when the wheel hub 383 and the handrim base section 39 are displaced from each other. Contrary to this, a separator (press ring 395, fixing screws 396) is provided which separates the core member 394 and the annular magnet 42 in the axial direction Da of the axle 32 against the attractive force generated due to the magnetism between the magnetized section 43 and the annular magnet 42. Thus, it is possible to smoothly displace the wheel hub 383 and the handrim base section 39 from each other by suppressing the frictional force generated between the core member 394 and the annular magnet 42 low.

Further, in this modification, the core member 394 includes the claw sections 394a extending from the holding section 394b in the axial direction Da of the axle 32 beyond the annular magnet 42. The separator is formed by the press ring 395 (pressing member) that comes into contact with the claw sections 394a from a side opposite to the holding section 394b in the axial direction Da and the fixing screws (fixing member) that fix the handrim base section 39 to the press ring 395. The press ring 395 presses the claw sections 394a in a direction to separate the holding section 394b from the annular magnet 42 against the attractive force due to the magnetism, whereby the core member 394 and the annular magnet 42 are separated. According to such a configuration, it is possible to smoothly displace the wheel hub 383 and the handrim base section 39 from each other by suppressing the frictional force generated between the core member 394 and the annular magnet 42 low.

Further, in this modification, the holding section 394b of the core member 394 is a nonmagnetic material. Such a configuration is preferable since the holding section 394b of the core member 394 does not magnetically affect the magnetized section 43 and the like.

In this modification, the "separator" is formed by the press ring 395 and the fixing screws 396. However, the specific configuration of the "separator" is not limited to this. Accordingly, the "separator" may also be configured as illustrated next.

Figure 30:
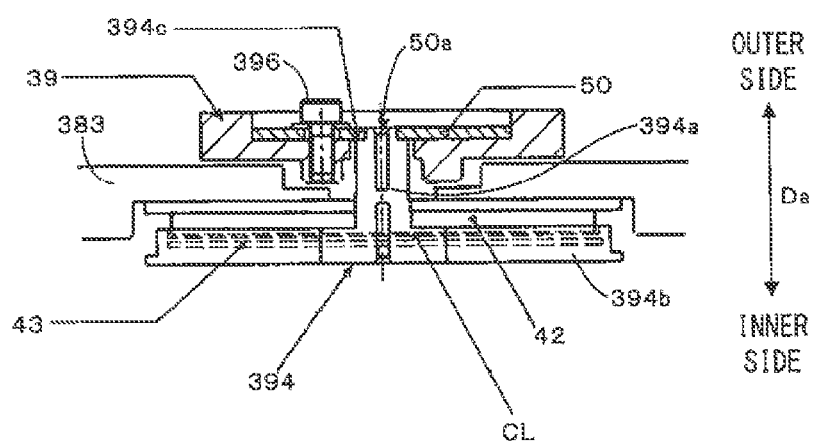
FIG. 30 is a top partial cross-sectional view partially showing a modification of the "separator" in a cross-section similar to that of FIG. 29.

FIG. 30 is a top partial cross-sectional view partially showing a modification of the "separator" in a cross-section similar to that of FIG. 29. In an example shown in FIG. 30, a stepped section 394c is formed on the outer end of the claw section 394a in the axial direction Da instead of eliminating the press ring 395. The stepped section 394c of the claw section 394a is held in contact with the inner surface of the annular plate 50 and a circular part on the tip thereof is fitted into a hole of the annular plate 50. When the annular plate 50 is fixed to the handrim base section 39 by the screws 396, the core member 394 is displaced in synchronization with the handrim base section 39 and pressed inwardly in the axial direction Da. This causes the annular plate 50 to firmly press the core member 394 in the axial direction Da against the attractive force generated due to the magnetism between the magnetized section 43 and the annular magnet 42, whereby the clearance CL between the holding section 394b of the core member 394 and the annular magnet 42 can be reliably ensured.

Figure 31:
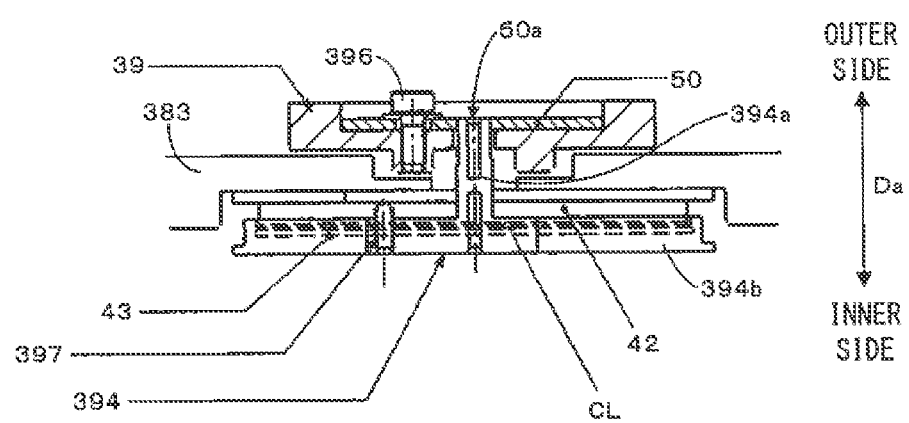
FIG. 31 is a top partial cross-sectional view partially showing a modification of the "separator" in a cross-section similar to that of FIG. 29.

FIG. 31 is a top partial cross-sectional view partially showing a modification of the "separator" in a cross-section similar to that of FIG. 29. In an example shown in FIG. 31, the core member 394 is provided with a set screw 397 instead of eliminating the press ring 395. That is, the set screw 397 screwed to the core member 394 projects outward in the axial direction Da from the core member 394 and is held in contact with the annular magnet 42. This causes the set screw 397 to firmly press the core member 394 in the axial direction Da against the attractive force generated due to the magnetism between the magnetized section 43 and the annular magnet 42, whereby the clearance CL between the holding section 394b of the core member 394 and the annular magnet 42 can be reliably ensured.

Various modifications other than those illustrated above can be made. For example, in the above examples, the core member 394 is mounted on the handrim base section 39 and the annular magnet 42 is mounted on the wheel hub 383. However, the core member 394 may be mounted on the wheel hub 383 and the annular magnet 42 may be mounted on the handrim base section 39. Also in such a configuration, if the wheel hub 383 and the handrim base section 39 are relatively displaced, the core member 394 and the annular magnet 42 are also relatively displaced, wherefore a relative displacement amount between the wheel 3 and the handrim 31 can be detected.

Further, the material, the size, the shape and the like of each component constituting the wheelchair 1 can also be changed as appropriate. For example, the material of the claw sections 394a and the holding section 394b of the core member 394 is not limited to the aforementioned one.

A power-assisted wheel according to an aspect of the invention is detachably mountable on a wheelchair. The power-assisted wheel includes an axle, a motor, a hub and a rotational displacement detection mechanism. The axle is supported on a frame of the wheelchair. The motor is mounted on the axle. The hub includes a wheel hub mounted on the axle and a handrim base section relatively displaceably supported on the wheel hub. The rotational displacement detection mechanism detects a rotational displacement of the handrim base section relative to the wheel hub and has a center of rotation coinciding with an axle center of the motor.

In the above power-assisted wheel, the center of rotation of the rotational displacement detection mechanism coincides with the axle center of the motor. Thus, the width of the wheel can be made smaller by using the motor having a smaller width in the axial direction. In this case, the motor does not interfere with a part of a frame and the above wheel is detachably mountable on many types of frames as compared with a configuration in which the motor extends in a wheelchair width direction of the wheel.

Since the above wheel has a small width, the width of the wheelchair does not become larger when the wheels are mounted on the frame. The wheelchair on which the above wheels are mounted is easy to move even in a narrow place such as indoors.

In the power-assisted wheel according to another aspect of the invention, a width of the motor in an axial direction of the axle is smaller than a width of the motor in a radial direction. The rotational displacement detection mechanism has a width smaller than the width of the motor in the axial direction of the axle.

Here, a width of the hub in the axial direction can be made smaller than in the case of using a motor whose width in the axial direction of the axle is larger than a width in the radial direction. The width of the hub in the axial direction can be made smaller than in the case where the rotational displacement detection mechanism is larger than the width of the motor in the axial direction. Thus, the width of the hub in the axial direction can be made smaller and the width of the wheel can be made smaller.

The power-assisted wheel according to another aspect of the invention further includes a power unit including the motor. The wheel hub is supported rotatably relative to the axle and spokes are fixed thereto. The power unit includes a gear train to transmit power transmitted from the motor to the wheel hub. The gear train includes a plurality of gears arranged from the axle toward a radial outer side and at least some of the gears overlap the rotational displacement detection mechanism in the axial direction.

Here, since the gear train includes the gears arranged toward the radial outer side, the thickness of the gear train in the axial direction is small. Further, the gear train at least partly overlaps the rotational displacement detection mechanism in the axial direction. Thus, the thickness of the power unit can be made smaller.

In the power-assisted wheel according to another aspect of the invention, the rotational displacement detection mechanism includes a magnet, a first plate and an element. The magnet is mounted on the wheel hub. The first plate is interlocked with the handrim base section. The element is mounted in the power unit accommodating the motor. The first plate changes magnetism by rotating relative to the magnet. The element detects a change in the magnetism.

Here, since the rotational displacement detection mechanism detects the rotational displacement of the wheel hub and the handrim base section by detecting the change in the magnetism, each component is not abraded. Thus, the detection accuracy of the rotational displacement detection mechanism is not reduced with use.

In the power-assisted wheel according to another aspect of the invention, the element includes a first element and a second element to detect magnetism, convert the detected magnetism into an electrical signal and output the electrical signal. The second element is arranged at such a position as to output a voltage having a phase inverted from the phase of a voltage of the electrical signal output from the first element when the handrim base section and the wheel hub rotate relative to each other.

Here, even if a fluctuation in the magnetism is detected by the first and second elements when the handrim base section and the wheel hub rotate relative to each other, the fluctuation in the magnetism can be canceled out by adding detection results of the first and second elements. Thus, a reduction in the detection accuracy due to the fluctuation in the magnetism can be prevented.

In the power-assisted wheel according to another aspect of the invention, the first element and second element are arranged more toward the second direction than a center of the axle in the first direction in a side view of the wheelchair. The first direction is a direction in which the plurality of gears of the gear train are arranged with respect to the axle in the side view of the wheelchair, and the second direction is a direction opposite to the first direction in the side view of the wheelchair.

Here, the gear train and the first and second elements can be arranged at positions overlapping in the axial direction. Thus, the thickness of the wheel can be made smaller as compared with a configuration in which the gear train and the first and second elements are shifted in the axial direction.

In the power-assisted wheel according to another aspect of the invention, the motor includes a rotor and a stator. The rotor includes a disk centered on the axle. The annular stator is arranged at a predetermined distance from the rotor in the axial direction of the axle and centered on the axle in a side view of the wheelchair. The rotor includes a cylinder surrounding a part of a side surface of the axle. The first and second elements are arranged radially outwardly of the cylinder.

Here, since the first and second elements are arranged around the cylinder, they can overlap the cylinder in the axial direction. Thus, the thickness of the entire wheel can be made smaller as compared with a configuration in which the first and second elements do not overlap the cylinder in the axial direction.

In the power-assisted wheel according to another aspect of the invention, the gear train is arranged between the motor and the wheel hub in the axial direction of the axle.

Further, the power-assisted wheel may be so configured that the rotational displacement detection mechanism includes a core member which has a magnetized section and a holding section to hold the magnetized section, a magnet displaceable relative to the core member in a rotating direction about the axle with facing the holding section in the axial direction of the axle, a detection element to detect magnetism generated by the magnetized section magnetized with an intensity corresponding to a displacement amount in the rotating direction relative to the magnet, and a separator to separate the core member and the magnet in the axial direction of the axle against an attractive force generated by magnetism between the magnetized section and the magnet; and one of the core member and the magnet is mounted on the wheel hub and the other is mounted on the handrim base section.

In such a configuration, the core member which holds the magnetized section by the holding section and the magnet are relatively displaceable in the rotating direction about the axle, and the magnetism generated by the magnetized section magnetized with the intensity corresponding to the mutual displacement amount is detected by the detection element. Further, one of the core member and the magnet is mounted on the wheel hub and the other is mounted on the handrim base section. Thus, as the wheel hub and the handrim base section are relatively displaced, the core member and the magnet are also relatively displaced. Therefore, a mutual displacement amount between the wheel hub and the handrim base section can be detected by the detection element.

It should be noted that an attractive force is generated due to magnetism between the core member and the magnetized section. At this time, if the holding section of the core member facing the magnet and the magnet are pressed toward each other by this attractive force, a frictional force generated between the core member and the magnet may become larger and there may be an influence when the wheel hub and the handrim base section are displaced from each other. Contrary to this, a separator is provided which separates the core member and the magnet in the axial direction of the axle against the attractive force generated due to the magnetism between the magnetized section and the magnet. Thus, it is possible to smoothly displace the wheel hub and the handrim base section from each other by suppressing the frictional force generated between the core member and the magnet low.

Further, the power-assisted wheel may be so configured that the core member includes a claw section extending from the holding section in the axial direction of the axle beyond the magnet, and the separator includes a pressing member which comes into contact with the claw section from a side opposite to the holding section in the axial direction of the axle and a fixing member which fixes the pressing member to the wheel hub or the handrim base section on which the core member is mounted, and separates the core member and the magnet by pressing the claw section in a direction with the pressing member to separate the holding section from the magnet against the attractive force. According to such a configuration, it is possible to smoothly displace the wheel hub and the handrim base section from each other by suppressing the frictional force generated between the core member and the magnet low.

At this time, the power-assisted wheel may be so configured that the core member is mounted on the wheel hub or the handrim base section by the engagement of the claw section.

Further, the power-assisted wheel may be so configured that the holding section of the core member is a nonmagnetic material. Such a configuration is preferable since the holding section of the core member does not magnetically affect the magnetized section and the like.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A power-assisted wheel detachably mountable on a wheelchair, comprising:
    an axle to be supported on a frame of the wheelchair;
    a motor mounted on the axle;
    a hub including a wheel hub mounted on the axle and a handrim base section supported displaceably relative to the wheel hub; and
    a rotational displacement detection mechanism configured to detect a rotational displacement of the handrim base section relative to the wheel hub and having a center of rotation coinciding with an axle center of the motor,
    wherein the rotational displacement detection mechanism includes a magnetized section, a magnet and a detection element to detect magnetism generated by the magnetized section magnetized with an intensity corresponding to a displacement amount in a rotating direction relative to the magnet, and one of the magnetized section and the magnet is mounted on the wheel hub and the other is mounted on the handrim base section.

2. The power-assisted wheel according to claim 1, wherein:
a width of the motor in an axial direction of the axle is smaller than a width of the motor in a radial direction; and
the rotational displacement detection mechanism has a width smaller than the width of the motor in the axial direction of the axle.

3. A power-assisted wheel detachably mountable on a wheelchair, comprising:
an axle to be supported on a frame of the wheelchair;
a motor mounted on the axle;
a hub including a wheel hub mounted on the axle and a handrim base section supported displaceably relative to the wheel hub; and
a rotational displacement detection mechanism configured to detect a rotational displacement of the handrim base section relative to the wheel hub and having a center of rotation coinciding with an axle center of the motor; and
a power unit including the motor, wherein:
the wheel hub is rotatable relative to the power unit and rotatably supported on the axle;
the power unit includes a gear train to transmit power transmitted from the motor to the wheel hub; and
the gear train includes a plurality of gears arranged from the axle toward a radial outer side and at least some of the gears overlap the rotational displacement detection mechanism in the axial direction.

4. The power-assisted wheel according to claim 3, wherein:
the rotational displacement detection mechanism includes a magnet mounted on the wheel hub, a first plate interlocked with the handrim base section, and an element mounted in the power unit;
the first plate changes magnetism by rotating relative to the magnet; and
the element detects a change in the magnetism.

5. The power-assisted wheel according to claim 4, wherein:
the element includes a first element and a second element to detect magnetism, convert the detected magnetism into an electrical signal and output the electrical signal; and
the second element is arranged at such a position as to output a voltage having a phase inverted from the phase of a voltage of the electrical signal output from the first element when the handrim base section and the wheel hub rotate relative to each other.

6. The power-assisted wheel according to claim 5, wherein:
the first element and second element are arranged more toward the second direction than a center of the axle in the first direction in a side view of the wheelchair, the first direction being a direction in which the plurality of gears of the gear train are arranged with respect to the axle in the side view of the wheelchair, and the second direction being a direction opposite to the first direction in the side view of the wheelchair.

7. The power-assisted wheel according to claim 5, wherein:
the motor includes a rotor with a disk centered on the axle, and an annular stator arranged at a predetermined distance from the rotor in the axial direction of the axle and centered on the axle in a side view of the wheelchair;
the rotor includes a cylinder surrounding a part of a side surface of the axle; and
the first element and second element are arranged radially outwardly of the cylinder.

8. The power-assisted wheel according to claim 3, wherein:
the gear train is arranged between the motor and the wheel hub in the axial direction of the axle.

9. The power-assisted wheel according to claim 1, wherein:
the rotational displacement detection mechanism includes a core member which has the magnetized section and a holding section to hold the magnetized section, the magnet displaceable relative to the core member in a rotating direction about the axle with facing the holding section in the axial direction of the axle, the detection element, and a separator to separate the core member and the magnet in the axial direction of the axle against an attractive force generated by magnetism between the magnetized section and the magnet.

10. The power-assisted wheel according to claim 9, wherein:
the core member includes a claw section extending from the holding section in the axial direction of the axle beyond the magnet; and
the separator includes a pressing member which comes into contact with the claw section from a side opposite to the holding section in the axial direction of the axle and a fixing member which fixes the pressing member to the wheel hub or the handrim base section on which the core member is mounted, and separates the core member and the magnet by pressing the claw section in a direction with the pressing member to separate the holding section from the magnet against the attractive force.

11. The power-assisted wheel according to claim 10, wherein:
the core member is mounted on the wheel hub or the handrim base section by engagement of the claw section.

12. The power-assisted wheel according to claim 9, wherein:
the holding section of the core member is a nonmagnetic material.

13. A wheelchair, comprising
a power-assisted wheel detachably mountable on a wheelchair, which comprises:
an axle to be supported on a frame of the wheelchair;
a motor mounted on the axle;
a hub including a wheel hub mounted on the axle and a handrim base section supported displaceably relative to the wheel hub; and
a rotational displacement detection mechanism configured to detect a rotational displacement of the handrim base section relative to the wheel hub and having a center of rotation coinciding with an axle center of the motor.

14. A wheelchair according to claim 13, wherein the rotational displacement detection mechanism includes a magnetized section, a magnet and a detection element to detect magnetism generated by the magnetized section magnetized with an intensity corresponding to a displacement amount in a rotating direction relative to the magnet, and one of the magnetized section and the magnet is mounted on the wheel hub and the other is mounted on the handrim base section.

15. A wheelchair according to claim 13, further comprising a power unit including the motor, wherein:
the wheel hub is rotatable relative to the power unit and rotatably supported on the axle;
the power unit includes a gear train to transmit power transmitted from the motor to the wheel hub; and
the gear train includes a plurality of gears arranged from the axle toward a radial outer side and at least some of the gears overlap the rotational displacement detection mechanism in the axial direction.

* * * * *